United States Patent [19]

Yoshida et al.

[11] Patent Number: 5,497,213
[45] Date of Patent: Mar. 5, 1996

[54] METHOD AND APPARATUS FOR READING BAR CODE OF PHOTOGRAPHIC FILM CASSETTE

[75] Inventors: Yutaka Yoshida; Yoshihiro Yoshikawa, both of Saitama, Japan

[73] Assignee: Fuji Photo Film Co., Ltd., Kanagawa, Japan

[21] Appl. No.: 260,812

[22] Filed: Jun. 16, 1994

[30] Foreign Application Priority Data

Jun. 18, 1993 [JP] Japan .................................. 5-148012

[51] Int. Cl.$^6$ ............................................. G03B 7/00
[52] U.S. Cl. ............................................. 354/21
[58] Field of Search ............................ 354/21; 235/463, 235/464, 466

[56] References Cited

U.S. PATENT DOCUMENTS

| | | |
|---|---|---|
| 4,533,825 | 8/1985 | Yamada . |
| 4,757,206 | 7/1988 | Ohta . |
| 5,032,854 | 7/1991 | Smart . |
| 5,049,912 | 9/1991 | Pagano et al. ............ 354/275 |
| 5,077,463 | 12/1991 | Sato . |
| 5,326,961 | 7/1994 | Sibata . |
| 5,329,105 | 7/1994 | Klancnik et al. . |

*Primary Examiner*—Monroe H. Hayes
*Attorney, Agent, or Firm*—Sughrue, Mion, Zinn, Macpeak & Seas

[57] ABSTRACT

A photographic film cassette has a bar code disc rotating with the spool. The bar code disc has a bar code formed by black and white bars. The bar code represents the film sensitivity and the number of photographed frames. Each bar includes a wide bar and a narrow bar representing binary information. A bar code sensor detects each bar and generates a photoelectrical signal. The width of each photoelectrical signal is measured to determine a pass time required for the bar to pass the bar code sensor. The bar width is judged from this pass time. In order to avoid an erroneous judgement to be caused by a change in the rotation speed of the bar code disc, the pass time of an old bar last read of the same type as or a different type from the type of a new bar presently read is used. In a preferred embodiment, in accordance with the pass time and width of the bar one bar before the new bar, a reference pass time corresponding to the pass time of the narrow bar is obtained. The reference pass time multiplied by 2 is used as a reference value. The pass time of the new bar presently read is compared with the reference value to judge the width of the new bar. In another embodiment, a modified pass time is calculated by adding the pass time of the old bar one bar before the new bar to the pass time of the new bar. A reference pass time is obtained from the modified pass time. The reference pass times multiplied by 3 and 5 are used as the reference values.

19 Claims, 18 Drawing Sheets

| PRECEDING VALUE | PRESENT VALUE | VALUE Tj |
|---|---|---|
| "0" | "0" | 2·Tref |
|  | "1" | 4·Tref |
| "1" | "0" |  |
|  | "1" | 6·Tref |

OUTPUT OF BAR CODE SENSOR

Th

OUTPUT OF BAR CODE SENSOR

OUTPUT OF BAR CODE SENSOR

METHOD AND APPARATUS FOR READING BAR CODE OF PHOTOGRAPHIC FILM CASSETTE

BACKGROUND OF THE INVENTION

1. Field of the Invention

The present invention relates to a method and apparatus for reading a bar code of a photographic film cassette of a camera, and more particularly to a method and apparatus for reading a bar code written on a bar code disc of a photographic film cassette while the film is advanced.

2. Description of the Related Art

There is known a photographic film cassette or cartridge of the type that the leader of the photographic film is advanced out of the cassette while the cassette spool rotates. U.S. Pat. No. 5,049,912 describes an improved version of the photographic film cassette of this type. This photographic film cassette has a bar code disc mounted on the cassette spool, the bar code disc being provided with written information specific to the film cassette, such as the sensitivity of the loaded film and the number of frames capable of being photographed.

The bar codes include black bars and white bars (spaces). Each bar includes a wide bar and a narrow bar in order to represent binary information. These bars are measured by a reflection type bar code sensor, and in accordance with measured signal widths, the widths of bars representing logical values "0" and "1" are determined. It is necessary for the measurement of a bar width to rotate a bar code disc at a constant angular velocity in the camera. If a rotation speed of a cassette spool is unstable, it becomes necessary to measure each bar by a bar code sensor, by using a high precision rotary encoder coupled to the bar code disc and generating pulses at each fine unit angle and by checking a feed amount of the photographic film.

The rotation speed of a motor for driving a camera spool in a film take-up chamber and for transporting a photographic film in the camera changes with an environmental temperature and camera battery condition. Even if the motor rotation speed is constant, the film transport speed changes with the diameter of a film roll wound about the camera spool. As the film transport speed changes, the angular velocity of the cassette spool changes correspondingly so that it is difficult to rotate the bar code disc at a constant angular velocity. If a high precision rotary encoder is used for reading bar codes, it is disadvantageous from the viewpoint of space and cost.

The center of an amplitude of a photoelectrical signal detected by a bar code sensor becomes lower or higher than a threshold value used as a criterion of a signal change, depending upon the remaining capacity of a battery, the position of a bar code disc, a variation of bar code sensor performance, or the like. In such a case, the amplitude (level) of a photoelectrical signal relative to the threshold level increases or decreases so that converted binary signals of "0" and "1" may indicate false values and generate errors of measured bar widths.

U.S. Ser. No. 08/100,322 filed on Aug. 2, 1993 describes a bar code disc recorded with black bar codes having different densities so as to represent logical values of "1" and "0". Although a read error to be caused by a change in an angular velocity of the bar code disc is not present, it is necessary for a correct read of different densities to use a high precision bar code sensor and a binarizing circuit.

SUMMARY OF THE INVENTION

It is a principal object of the present invention to provide a bar code reading method and apparatus capable of reading a bar code correctly and easily without being affected by a change in the rotation speed of a bar code disc.

It is another object of the present invention to provide a bar code reading method and apparatus capable of setting the center of an amplitude of a photoelectrical signal detected by a bar code sensor to a binarization threshold value.

In order to achieve the above and other objects of the present invention, in determining the width of a new black bar or new white bar (space) presently read, reference is made to a signal width (bar pass time) of the last read old bar of the same type as, or a different from, the type of the new bar. Specifically, a reference value is obtained in accordance with the signal width of an old bar, the reference value corresponding to a signal width having generally an intermediate value between a narrow signal width and a wide signal width. The signal width of a new bar is compared with the reference value to judge the width of the new bar, i.e., the logical value of the new bar. A bar code is constructed of alternately disposed black and white bars. If the old bar of the same type is used, the old bar two bars before the new bar is used, and if the old bar of the different type is used, the old bar one bar before the new bar is used.

According to a preferred embodiment of the present invention, the signal width of an old bar is added to the signal width of a new bar to obtain a modified signal width of the new bar. In this case, two reference values are obtained from the modified signal width of the bar one bar before the present bar. The first reference value is an addition of the signal widths of two narrow bars, and the second reference value is an addition of the signal widths of two wide bars. If the modified signal width is smaller than the first reference value, the width of the new bar is judged to be narrow (logical value "0"), whereas if the modified signal width is larger than the second reference value, the width of the new bar is judged to be wide (logical value "1"). If the modified signal width is between the first and second reference values, it is judged that the signal width of the new bar has the width opposite to the signal width of the old bar one bar before the new bar.

According to the bar code reader of this invention, a bar code sensor is provided for reading a bar code. The bar code sensor has a light projector and a photosensor. The amplitude center of a photoelectrical signal of the bar code sensor is adjusted to be coincide with a threshold value of a binarizing means. This adjustment is performed by controlling the intensity of light from the light projector, by controlling the intensity of reflected light to be received by the photosensor, or by adjusting the level of an output signal of the photosensor. It is effective to use an AC amplifier which amplifiers a signal with the amplitude center being fixed to the threshold value.

According to the present invention, a signal width of an old bar is referred when the width of a new bar is determined. It is therefore possible to correctly determine the width of a new bar without being affected by rotation various of the spool. Furthermore, the modified signal width obtained by adding the signal width of an old bar to the signal width of the new bar, and at least two reference values obtained from old bar modified signal widths are used. Accordingly, even if the threshold value and the amplitude center of a photoelectrical signal are shifted, the bar width can be correctly determined. In addition, since the level of a photoelectrical signal is adjusted relative to the threshold value, the bar width can be correctly determined.

In this specification, the black and white bars are not intended to represent their colors, but intended to represent their densities. Namely, the black bar has a high density, and the white bar has a low density. For example, if a red bar is recorded on a grey bar code disc, the grey bar corresponds to a white bar and the red bar corresponds to a black bar.

BRIEF DESCRIPTION OF THE DRAWINGS

The above and other objects and advantages of the present invention will become apparent from the detailed description of the preferred embodiments when read in conjunction with the accompanying drawings, in which.

DETAILED DESCRIPTION OF THE PREFERRED EMBODIMENTS

Figure 1:
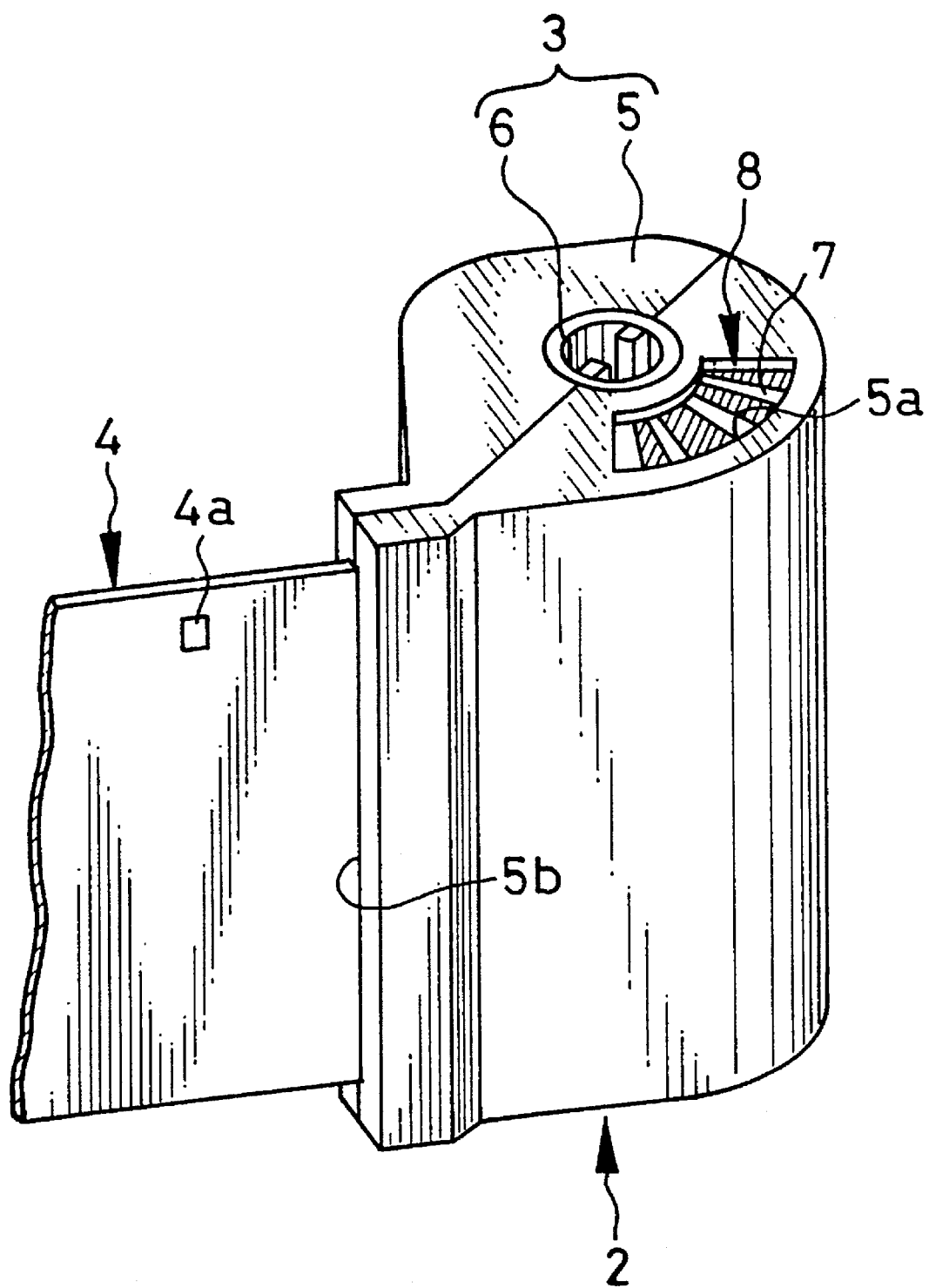
FIG. 1 is a perspective view of a photographic film cassette having a bar code disc.

Referring to FIG. 1, a photographic film cassette 2 has a plastic cassette 3 and a photographic film such as a negative film 4 housed in the plastic cassette 3. The plastic cassette 2 is constituted by a cassette shell 5 and a cassette spool 6 which is housed in the shell 5 and rotatable. The cassette spool 6 has a core 6a (refer to FIG. 4) about which the photographic film is wound, and a pair of flanges regulating the positions of opposite ends of the film roll. The negative film 4 is formed with perforations 4a at a predetermined pitch so as to provide one perforation per one frame. A transparent magnetic recording layer may be formed on the bottom surface of the negative film 4 to magnetically record photographic information.

The cassette spool 6 has a bar code disc 8 fixed thereto and formed with bar codes 7. The bar code disc 8 is exposed through a window 5a of the cassette shell 5. The bar codes 7 represent various information such as the sensitivity, the number of frames capable of being photographed, and the film latitude, the manufacture date, the manufacturer name, respectively of the negative film 4. In this embodiment, one flange is used as the bar code disc 8 on the outer plane of which the bar codes 7 are recorded. Alternatively, a sheet printed with bar codes may be attached to the outer plane of the flange. A bar code disc may be mounted on the core 6a at a portion outside of the flange.

The photographic film 2 is wound in the cassette shell 5 and the leader thereof, completely contained in the cassette shell 5 before use. As the cassette spool 6 is rotated, the film leader is advanced out of the cassette shell 5 via a film passage slit 5b. In order to prevent the film roll from becoming loose while the cassette spool 6 is rotated, ring ridges 5c are mounted on the inner wall of the cassette shell 5 near at opposite ends thereof. One flange may be made movable to clamp the film roll by the flange pair and prevent the roll from becoming loose.

Figure 2:
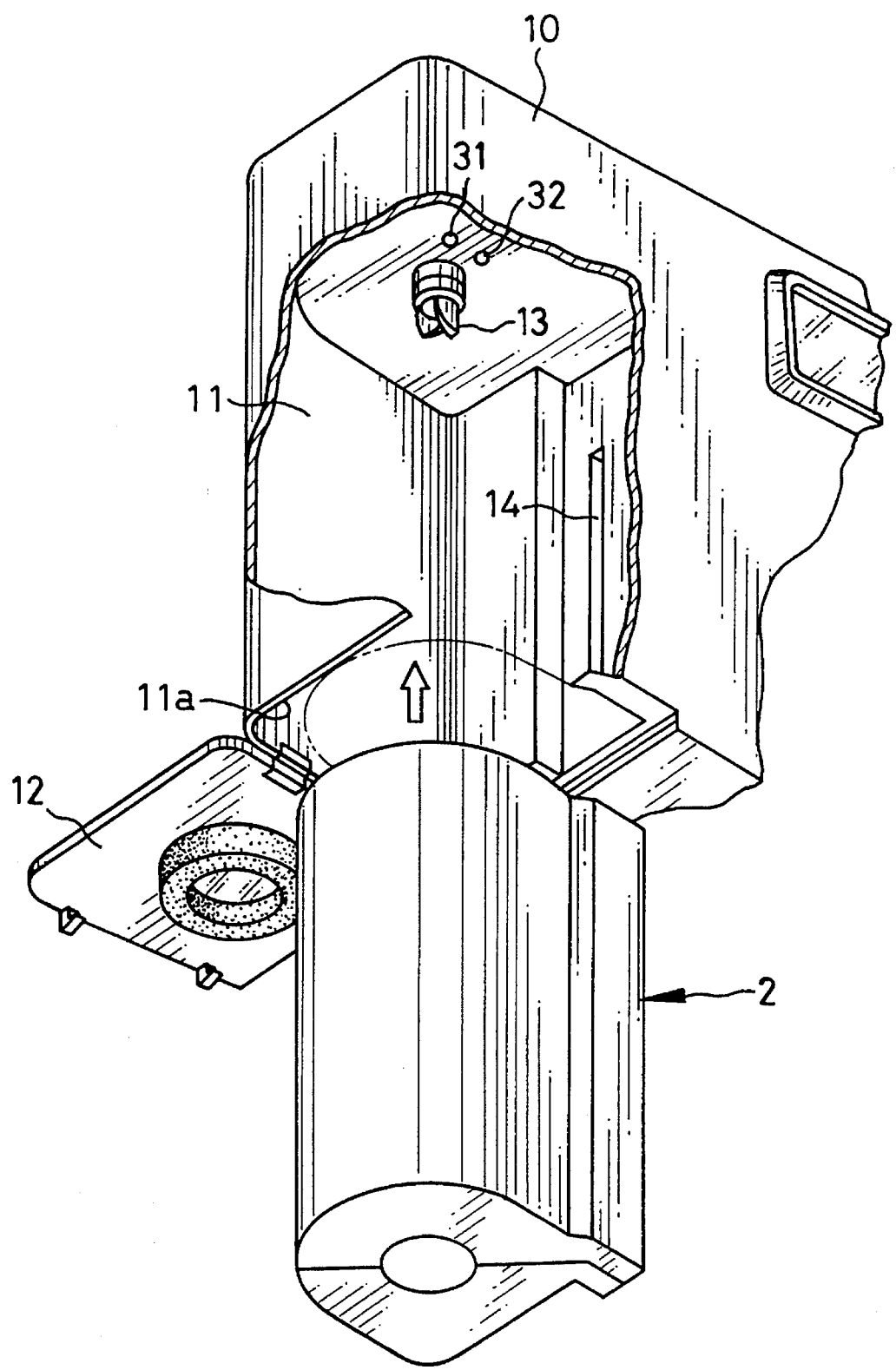
FIG. 2 is a perspective view showing the loading of a photographic film cassette into a camera.

Referring to FIG. 2, a camera body 10 is formed with a cassette chamber 11 as well known in the art, and the bottom 11a thereof has a door 12. The photographic film 2 is inserted into the cassette chamber 11 from the bottom 11a so that the cassette spool 6 is coupled to a fork 13. As well known in the art, the fork 13 is rotated in the normal or reverse direction by a motor mounted in a camera spool (not shown). In the cassette chamber 11, a light emitting diode 31 and a phototransistor 32 are mounted for reading the bar codes 7 of the bar code disc 8.

Figure 3:
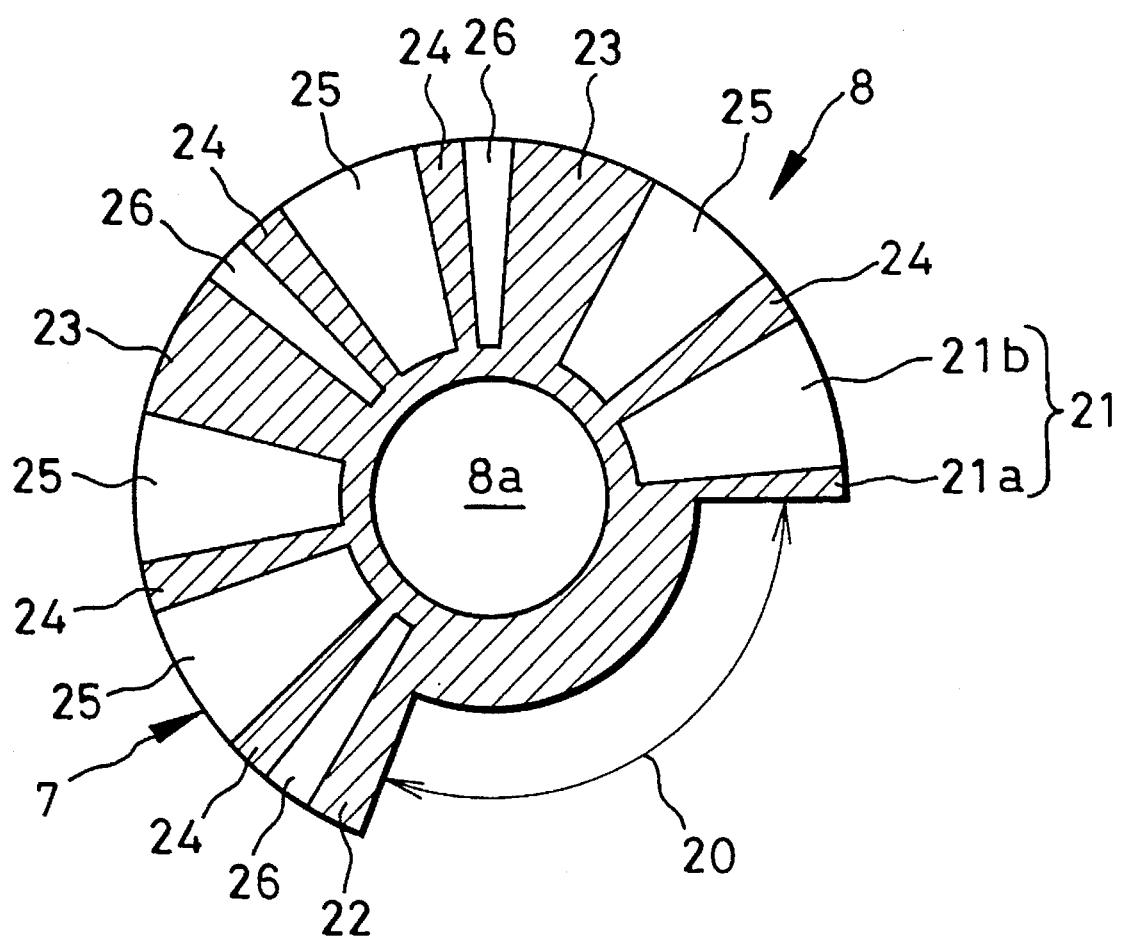
FIG. 3 is a plan view of a bar code disc.

As shown in FIG. 3, the bar code disc 8 is formed with a hole 8a at the center of the disc, the core 6a being fitted in this hole 8a. The bar code disc 8 has an arc recess which is a black quiet zone 20, and black bars having a low reflectance and white bars (spaces) having a high reflectance are recorded on the bar code disc 8. The bar codes 15 include a start area 21, an end area 22, and a data area between the start and end areas for representing information specific to the film. The data area is constructed of wide black bars 23, narrow black bars 24, wide white bars 25, and narrow white bars 26. The black bars and white bars are alternately disposed, the first bar being a black bar and the last bar being a white bar.

The width (angle) of the narrow black bar 24 or narrow black bar 26 is a unit width (unit angle), and the width of the wide black bar 23 or wide white bar 25 is an integer multiple of the unit width. In this embodiment, the width (angle) ratio of the narrow black bar 24 to the wide black bar 23 is 1:3. Similarly, the width (angle) ratio of the narrow white bar 26 to the narrow white bar 25 is 1:3. Regardless of the type of a bar, the wide bar represents a logical value of "1", and a narrow bar represents a logical value of "0". The start area 21 has a bar 21a and a reference section 21b having a unit width multiplied by A, for example, multiplied by 3.

Figure 4:
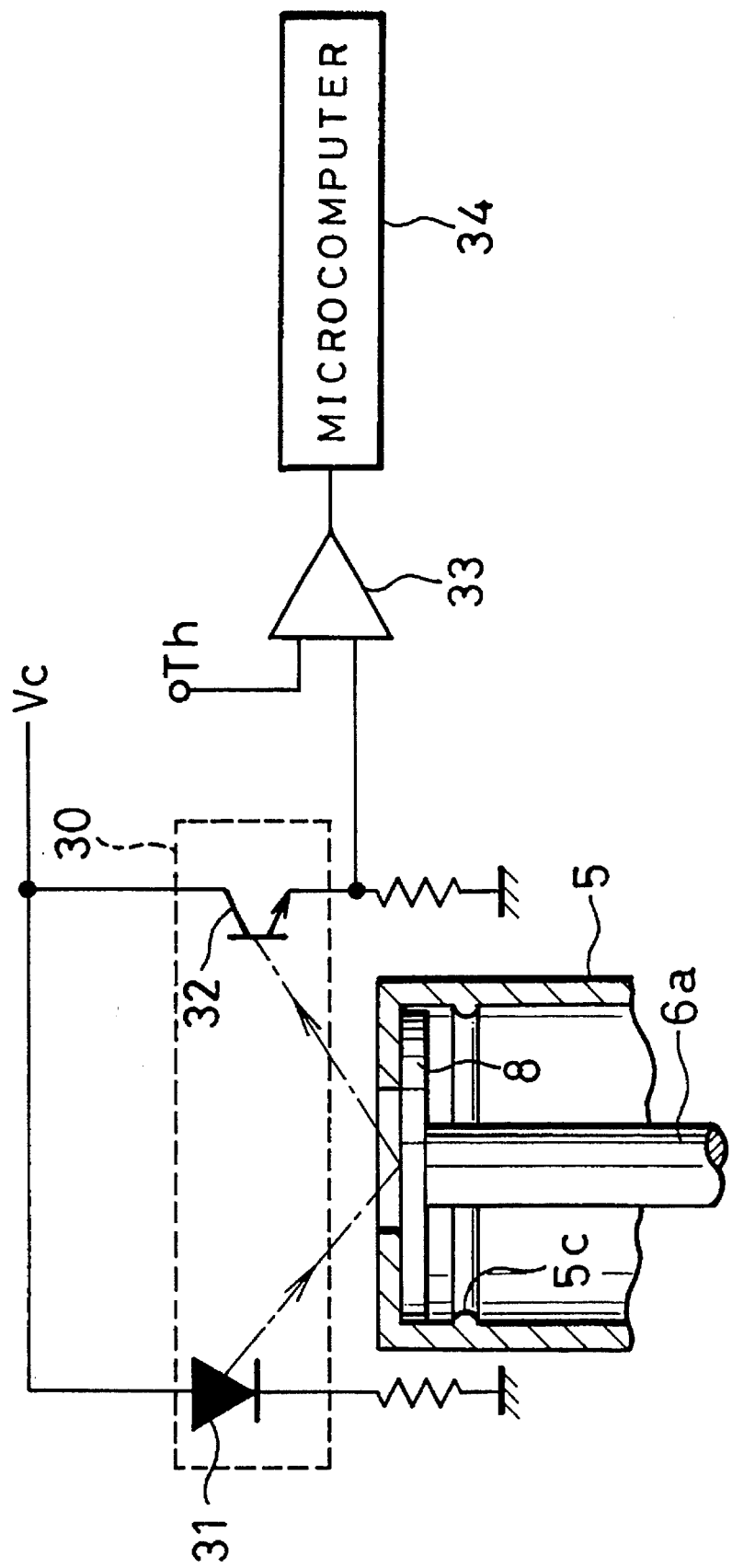
FIG. 4 is a circuit diagram of a bar code reader.

Referring to FIG. 4 showing a bar code reader, a bar code sensor 30 is constructed of a light projector and a photosensor. In this embodiment, a light emitting diode 31 is used as the light projector and a phototransistor 32 is used as the photosensor. A photoelectrical signal from the phototransistor 32 is sent to a waveform shaper 33 which makes the edges of rise and fall (leading and trailing edges) of the photoelectrical signal sharp. A comparator for example is used as the waveform shaper 33, and binarizes the photoelectrical signal from the photosensor 30 by comparing it with a threshold value Th. Specifically, If the output level of a photoelectrical signal is higher than the threshold value Th, an H level signal having a predetermined voltage is outputted, whereas if it is lower than the threshold value Th, an L level signal having a predetermined voltage is outputted.

A microcomputer 34 has a timer, a ROM, and a RAM. Written in ROM is a program for analyzing the bar codes 15 based upon the widths of binary signals from the waveform shaper 33. Written in RAM are analyzed bar logical values, reference values, variables, and the like. An LCD display is connected to the microcomputer 34 so as to display decoded bar code information.

The basic operation of the embodiment described above will be described with reference to FIG. 5. First, as shown in FIG. 2, the door 12 is opened to insert a photographic film cassette 2 into the cassette chamber 11. The core 6a of the photographic cassette 2 is coupled to the fork 13. As the door 12 is closed, the cassette chamber 11 is shielded from external light. In response to the closing operation of the door 12, the motor rotates. The rotation of the motor is transmitted via the fork 13 to the cassette spool 6. The cassette spool 6 rotates with the roll of the negative film 4. During this rotation, the film leader is separated from the film roll by a separation craw, and pulled out of the cassette 5 via the film passage slit 5b.

The film leader is transported to the exposure station via a tunnel 14, passed through the tunnel 14, entered in the take-up chamber to be captured at the outer periphery of the camera spool rotating in the chamber. When the first frame is set to the exposure station, the rotation of the motor is stopped to terminate the film initial advancement. Thereafter, each time the shutter button is depressed and a scene is taken, the motor rotates to wind the negative film 4 about the camera spool one frame after another. When all frames have been photographed, the motor automatically rotates in the reverse direction to rewind the exposed negative film about the outer periphery of the cassette spool 6.

During the transport of the negative film, the bar code disc 8 rotates with the cassette spool 6. During the rotation of the bar code disc 8, the bar codes 7 are read by the bar code sensor 30 sequentially in the counter clockwise direction starting from the start area 21. The microcomputer 34 distinguishes the start area 21 by detecting the black quiet zone 22 and the black and white pattern of the start area 21. If the start area 21 is read first, the microcomputer 34 judges that the bar codes 7 are being read in the correct order. If the start area is read last, the microcomputer 34 judges that the bar codes have been read in the reverse direction, and the order of the read bar codes are reversed.

During the rotation of the bar code disc 8, if a black bar is positioned at the read position of the bar code sensor 30, the level of a photoelectrical signal of the phototransistor 32 is low. Conversely, if a white bar is positioned at the read position, the level is high. If the level of a photoelectrical signal is higher than the threshold value Th, the waveform shaper 33 outputs the H level signal, whereas if the level is lower than the threshold value Th, it outputs the L level signal. Depending upon whether the level is L or H, the microcomputer 34 discriminates between the black and white bars.

While the phototransistor 32 detects the transition area from the white bar to the black bar, the level of the photoelectrical signal gradually lowers. Therefore, the output signal of the waveform shaper 33 changes from the H level to the L level. Conversely, while the phototransistor 32 detects the transition area from the black bar to the white bar, the level of the photoelectrical signal gradually rises. Therefore, the output signal of the waveform shaper 33 change from the L level to the H level. When a transition or inversion of an output signal of the waveform shaper 33, i.e., the rise or fall of the photoelectrical signal, is detected, a timer starts counting clock pulses having a predetermined period to measure the width of a signal of the waveform shaper 33. This signal width represents a time required for a bar passing the read position of the bar code sensor 30, and is correlated with the rotation speed of the bar code disc 8 and the bar width.

Figure 5:
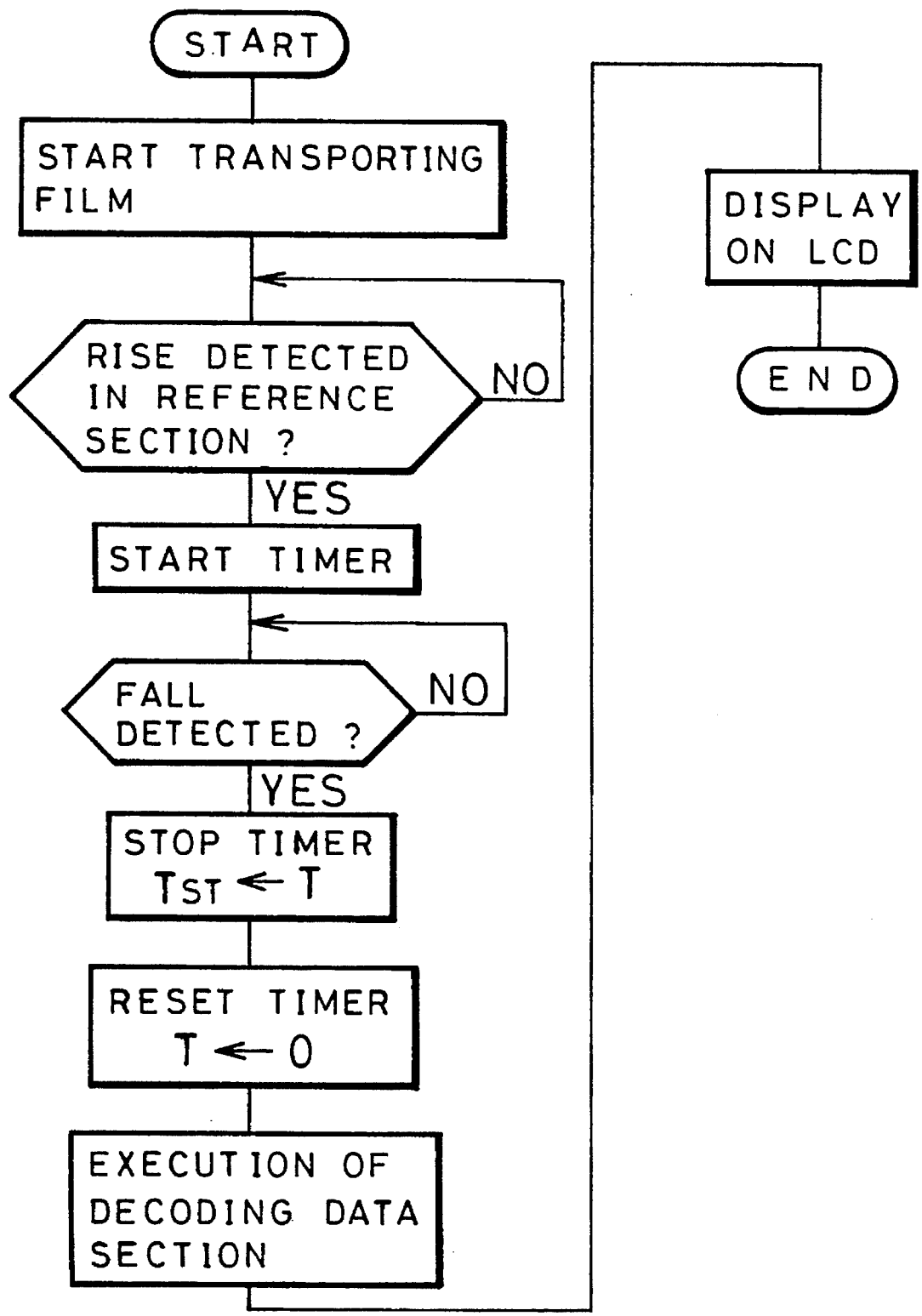
FIG. 5 is a flow chart explaining the fundamental operation of the bar code reader.

In the case of the bar code pattern shown in FIG. 3, the bar code sensor 30 first detects the bar 21a of the start area 21. While the bar 21a passes the read position of the bar code sensor 30 and the reference section 21b comes to the read position of the bar code sensor 30, the photoelectrical signal of the phototransistor 32 rises gradually. When the photoelectrical signal becomes higher than the threshold level Th, an output signal of the waveform shaper 33 changes from the L level to the H level. As shown in FIG. 5, at this signal inversion, the timer is reset (T= 0) to start a new count operation. This signal inversion is a signal rise so that in FIG. 5, a term "RISE DETECTED IN REFERENCE SECTION ?" is used instead of "signal inversion detected ?".

As the bar code disc 8 further rotates, the narrow black bar 24 comes in front of the bar code sensor 30 so that the photoelectrical signal lowers gradually. When the photoelectrical signal becomes lower than the threshold level Th, the H level signal changes to the L level signal. The microcomputer 34 stores the timer count $T_{ST}$ at this time in RAM. This timer count $T_{ST}$ corresponds to a pass time of the reference section 21b, i.e., the width of the H level signal outputted from the waveform shaper 33. The microcomputer 34 resets the timer immediately after the timer count $T_{ST}$ is stored in RAM.

Next, the wide white bar 25 faces the photosensor 34, and an output of the waveform shaper 33 changes to the L level. Basing upon a timer count T at this time, the microcomputer 34 determines whether the logical value is "0" or "1". This timer count T corresponds to a signal width (pass time) of the black bar 24.

The microcomputer 34 resets the timer to start counting for the measurement of a pass time of the white bar 25. Next, when the wide black bar 23 faces the photosensor 30, an output of the waveform shaper 33 changes to "L". Based upon a timer count T at this time, the microcomputer 34 determines whether the logical value is "0" or "1". The timer count T corresponds to a signal width of the white bar 25.

Bars are sequentially read and logical values thereof are determined from the signal widths in the manner described above, until the bar code sensor 30 detects the end area 22 and an output of the waveform shaper 33 changes to the L level. The obtained bar code data includes information of the film sensitivity, film latitude, the number of photographed frames, and the like. Such information is displayed on the LCD panel. The film sensitivity and film latitude are sent to an exposure controller for the control of the shutter and aperture. The number of photographed frames is changed to the number of left frames which is displayed on the LCD panel and is decremented each time one frame is photographed. When the number of left frames becomes "0", the motor rotates in the reverse direction to rewind the exposed negative film 4 into the cassette 5.

Next, an example of reading bar codes will be described with reference to FIG. 6. The timer count $T_{ST}$ obtained by reading the reference section 21 corresponds to the unit width of a narrow bar multiplied by A. Therefore, a reference timer count Tref corresponding to the unit width is $T_{ST}/A$. This reference timer count Tref is used for determining the width of the first bar in the data section, and is renewed each time a bar is read.

A change in a signal width will be explained. The rotation speed of the bar code disc 8 changes with the characteristics of each motor, the remaining capacity of a battery, a film roll diameter, a load change, a voltage change, or the like. As a result, time required for the unit width to pass the photosensor 30, i.e., a signal width of the unit width, cannot be fixed to a predetermined value. In the case of the motor characteristics and the battery remaining capacity, the rotation speed of the motor changes gradually, so that it can be assumed that the rotation speed of a bar presently read is generally equal to the rotation speed of the bar read immediately before the present bar. However, in the case of the load change and voltage chance, a variation of the rotation speed of the motor occurs quickly. Therefore, it is not possible to assume that the present rotation speed is generally equal to the rotation speed at the time of reading the bar immediately before the present bar.

In determining a reference value from the signal width of a bar immediately before the present bar, it is preferable to use a reference value of 2×Tref in order to provide a margin of logical decision. In this case, the wide bar has a measured timer count T larger than the reference value (2×Tref), and the narrow bar has a measured timer count T smaller than the reference value (2×Tref).

If the logical value of the preceding bar is "0", this bar is the narrow bar having the unit width so that Tref is set to T, whereas if the logical value of the preceding bar is "1", this bar is the wide bar having the unit width multiplied by 3 so that Tref is set to T/3. A timer count T of a presently read bar is compared with the reference value (2×Tref) obtained from the signal width of the preceding bar to determine the logical value of the present bar. If the timer count T is larger than the reference value, the bar is the wide bar and the logical value "1" is allocated thereto, whereas if the timer count T is smaller than the reference value, the bar is the narrow bar and the logical value "0" is allocated thereto. The obtained logical value is stored in RAM of the microcomputer 34. A new reference timer count Tref is determined from the timer count T at this time and replaced by the old reference timer count Tref.

Figure 6:
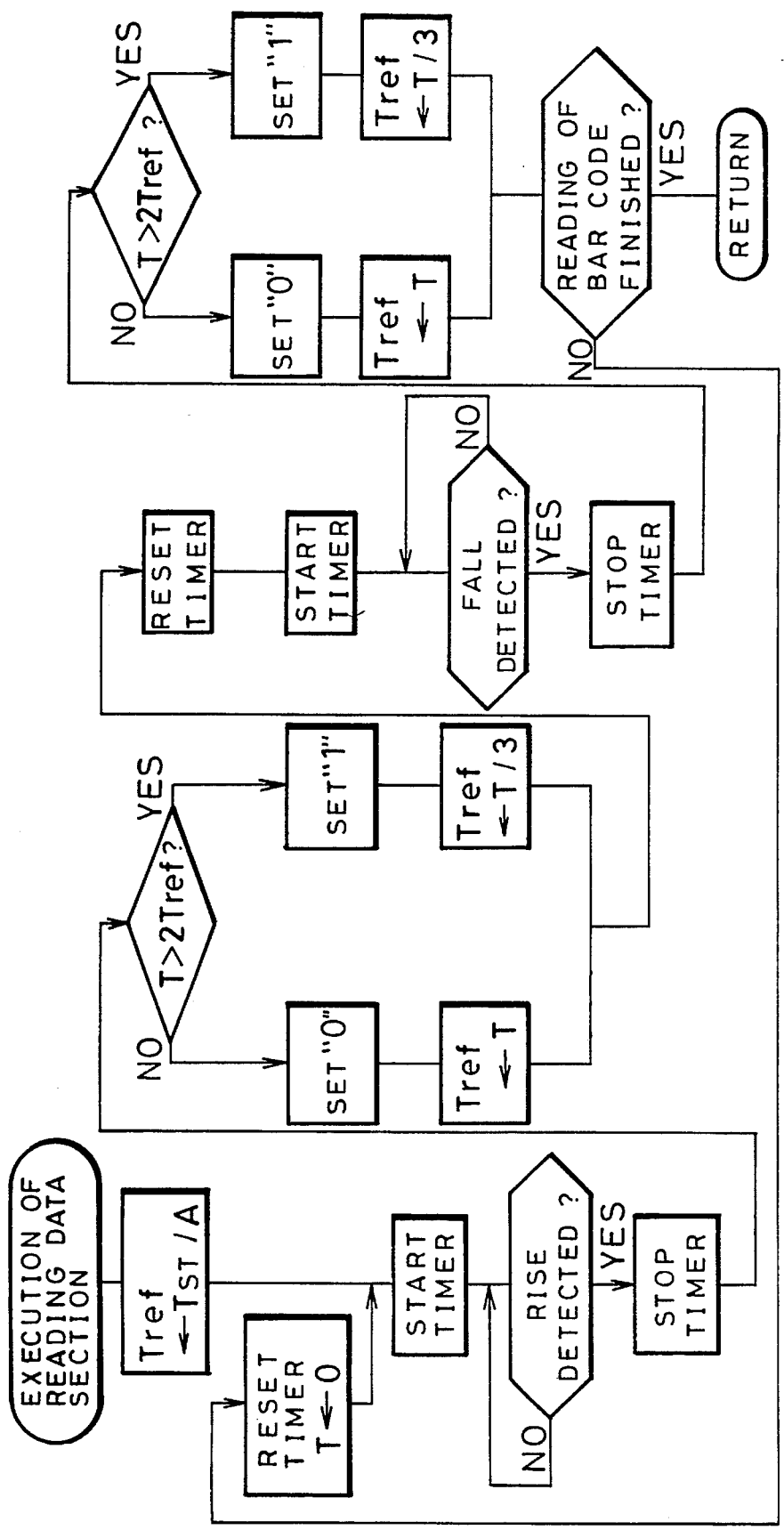
FIG. 6 is a flow chart explaining the operation of determining a reference value from a signal width of a last read bar of the same type as the present bar, according to an embodiment of the present invention.

The flow chart shown in FIG. 6 explains the operation of reading the first black bar 24 and the next white bar 25. Also in this flow chart, instead of using a term "signal inverted ?" or "edge detected ?", a term "RISE DETECTED ?" is used for an inversion from the black bar to the while bar and a term "FALL DETECTED ?" is used for an inversion from the white bar to the black bar.

By calculating the reference timer count Tref from the preceding timer count T and determining the reference value from the reference timer count Tref, it is possible to precisely judge the bar width without being affected by a rotation speed variation. Although the reference timer count Tref multiplied by 2 is assumed as the reference value, this value may take any value if it is larger than the reference timer count Tref and smaller than the reference timer count Tref multiplied by 3.

Figure 7:
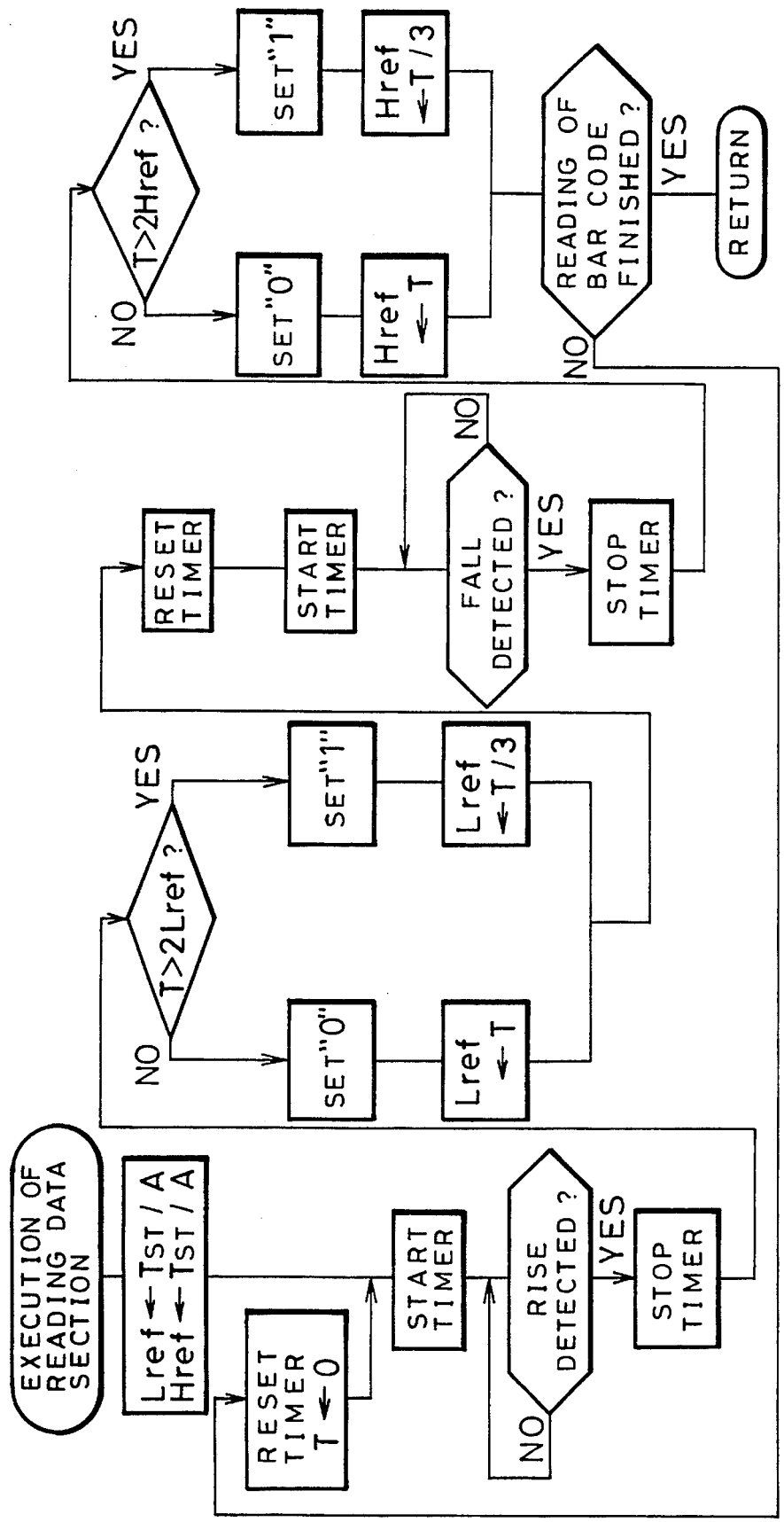
FIG. 7 is a flow chart explaining the operation of determining a reference value from a signal width of a last read bar of a different type from the present bar, according to another embodiment of the present invention.

The flow chart shown in FIG. 7 explains the operation of determining a width of a present bar by using a signal width of a bar read previously, the bar being of the same type as the present bar. Similar to the above-described embodiment, the reference section 21b is first read to determine the first reference timer count corresponding to the signal width ($T_{ST}/A$) of the unit width. At this time, a reference timer count Lref for the white bar and a reference timer count Href for the black bar are calculated. The reference timer count Lref or Href multiplied by 2 is used as the reference value.

After the reference section 21b passes, the measurement of a bar width in the data area starts. The microcomputer 34 discriminates between the black and white bars based upon the signal level. For the white bar, the reference value (2×Href) obtained from the white bar reference timer count Href is used, and for the black bar, the reference value (2×Lref) obtained from the black bar reference timer count Lref is used.

The first bar in the data area is the black bar 24 so that the timer count T of this bar is compared with the reference value (2×Lref) to judge the width of the black bar 24. The obtained logical value is stored in RAM. If the logical value of this black bar 24 is determined to be "0", the timer count T is used as the new reference timer value Lref, whereas if the logical value is determined to be "1", the timer count T/3 is used as the reference timer value Lref. The new timer count is stored in RAM. Immediately after the timer value T of the black bar 24 is stored, the timer is reset to restart counting.

Next, the white bar 25 is detected. The timer count T of the white bar 25 is compared with the reference value (2×Href) to judge the width of the white bar 25. The logical value obtained by the width judgement is stored in RAM. If the logical value is determined to be "0", the timer count T is used as a new reference timer count Href and stored in RAM, whereas if the logical value is determined to be "1", the timer count T/3 is used as a new reference timer count Href and stored in RAM. In this manner, the bar width is judged by using the latest reference timer counts Lref and Href.

Figure 8A:
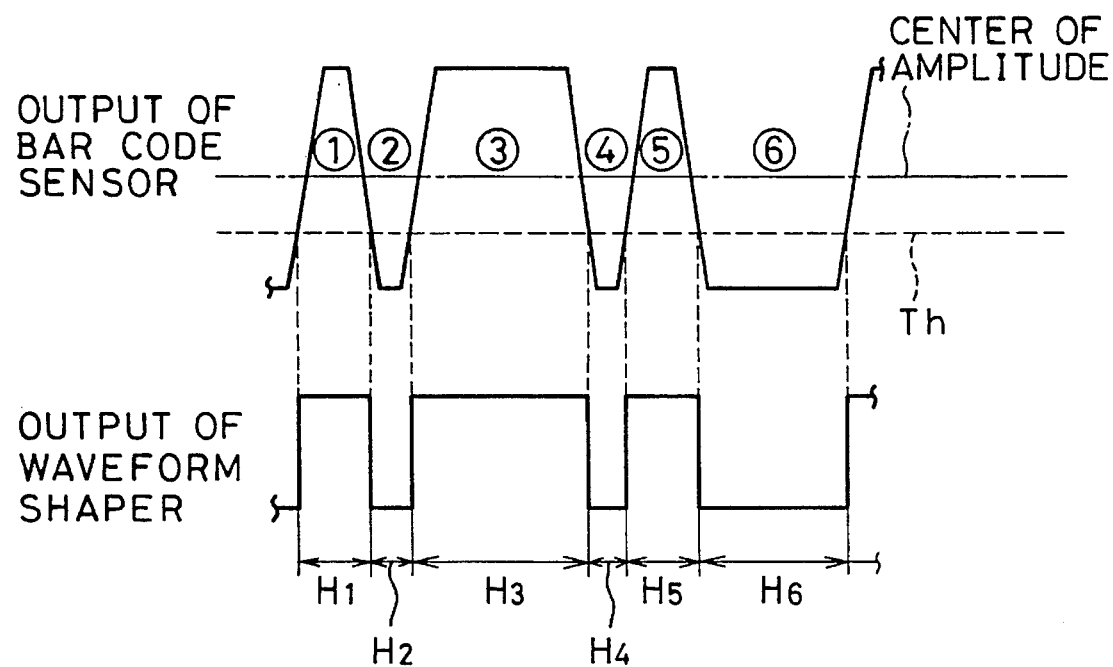
FIGS. 8A and 8B an example of bar codes and the waveforms of signals from the photosensor and waveform shaper, explaining the operation of the embodiment shown in FIG. 7.
Figure 8B:
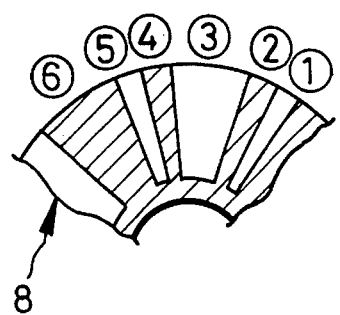

The amplitude center of the photoelectrical signal may become lower or higher than the threshold value Th of the waveform shaper 33 because of a drive voltage change of the bar code sensor 30. FIG. 8A shows an output signal of the bar code sensor 30 reading a fraction of the bar codes shown in FIG. 8B and an output signal of the waveform shaper 33. For example, the narrow black and white bars generate the logical value "0" and the signal widths H1 and H2 of the waveform shaper 33 are essentially the same. However, if the amplitude center of the photoelectrical signal shifts from the threshold value Th, the signal widths H1 and H2 become different.

In addition, the ratio of the signal width H2 to the signal width H3 becomes different from 1:3, and the ratio of the signal width H3 to the signal width H4 becomes different from 3:1. This results from that an output level of the bar code sensor 30 increases or decreases gradually and a transition time from the highest value to the threshold value Th differs from a transition time from the lowest value to the threshold value Th. Therefore, the width of a signal outputted from the waveform shaper 33 shifts from the signal width satisfying the ratio of 3:1.

It is to be noted however that a ratio of 1:1 or 3:1 is satisfied between the signal widths of only L levels or only H levels. It becomes therefore possible to reliably judge a signal width by determining the reference timer count from the signal width of a bar two bars before the present bar having the same type as the present bar, even if the amplitude center is not coincident with the threshold value Th. In the above embodiment, the first reference timer count Lref for the black bar is determined from the white bar in the reference section, a black bar and a white bar may be recorded in the reference section to determine the reference timer count Lref from this black bar.

Figure 9A:
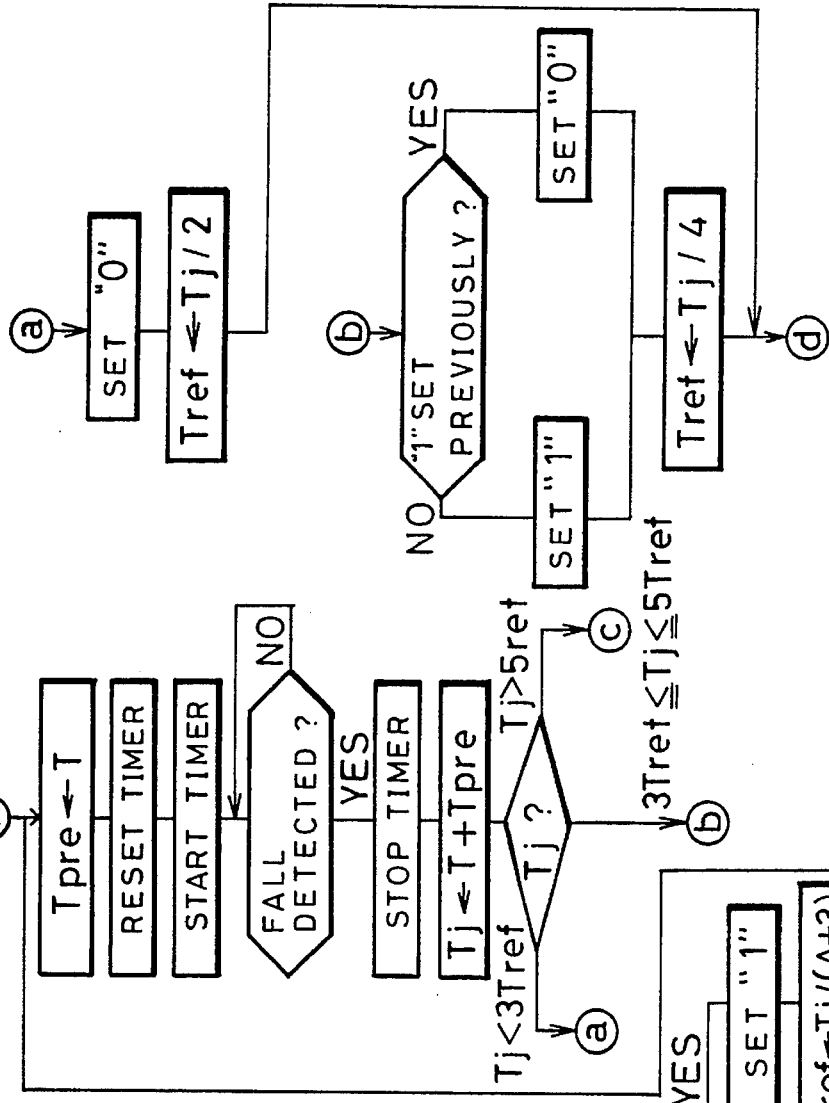
FIGS. 9A to 9D are flow charts explaining the operation of determining a reference value by adding a signal width of a last read bar to that of the present bar, according to another embodiment of the present invention.
Figure 9B:
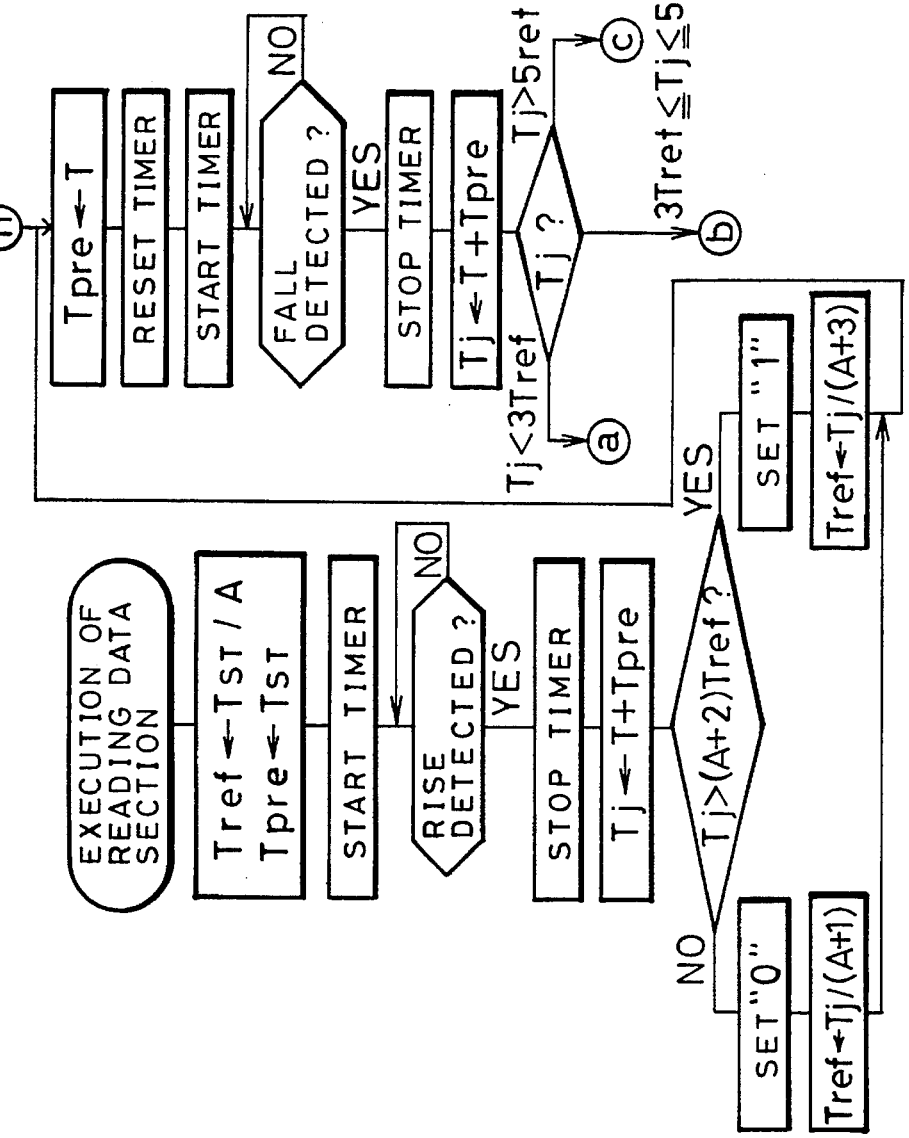
Figures 9C, 9D:
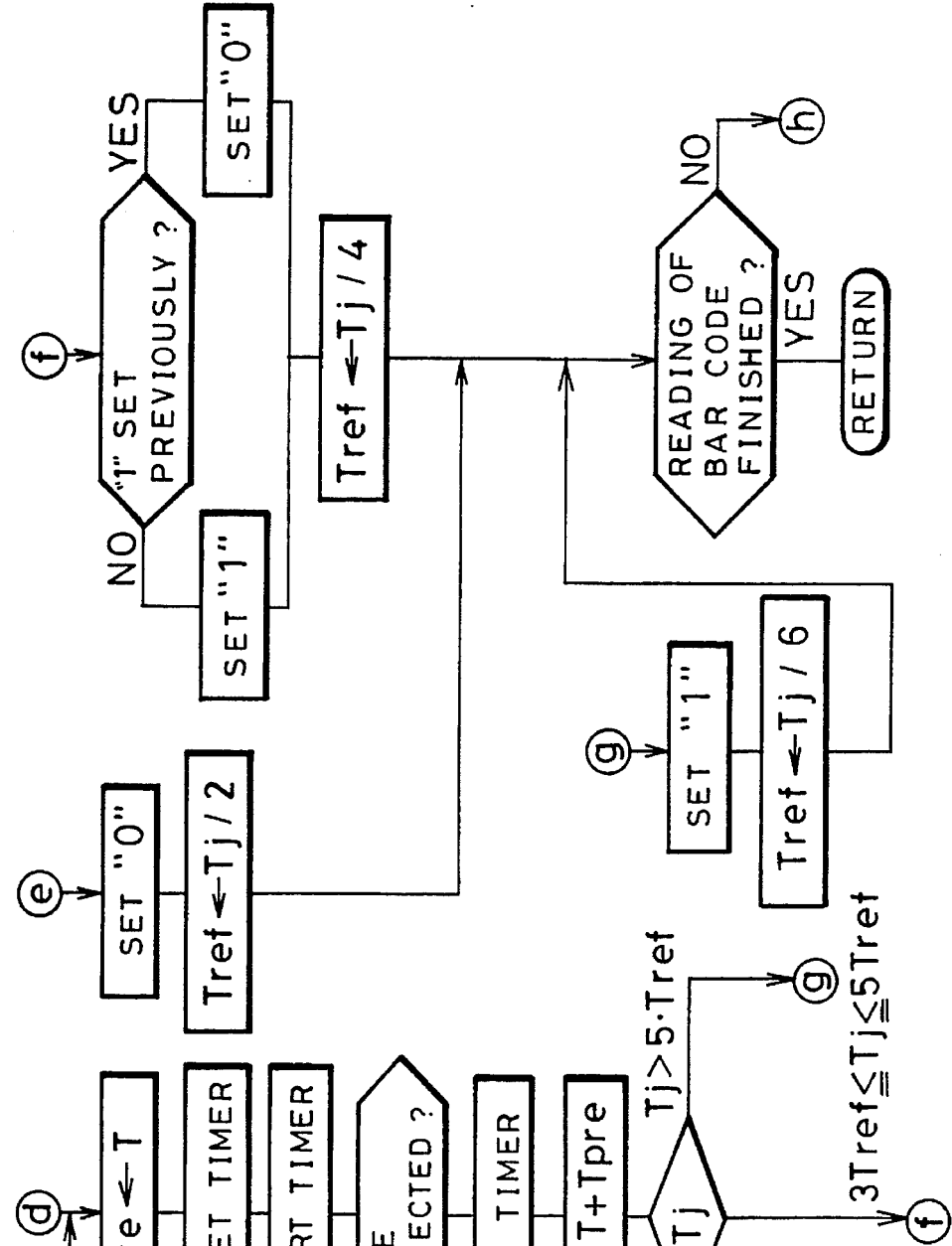
Figure 10A:
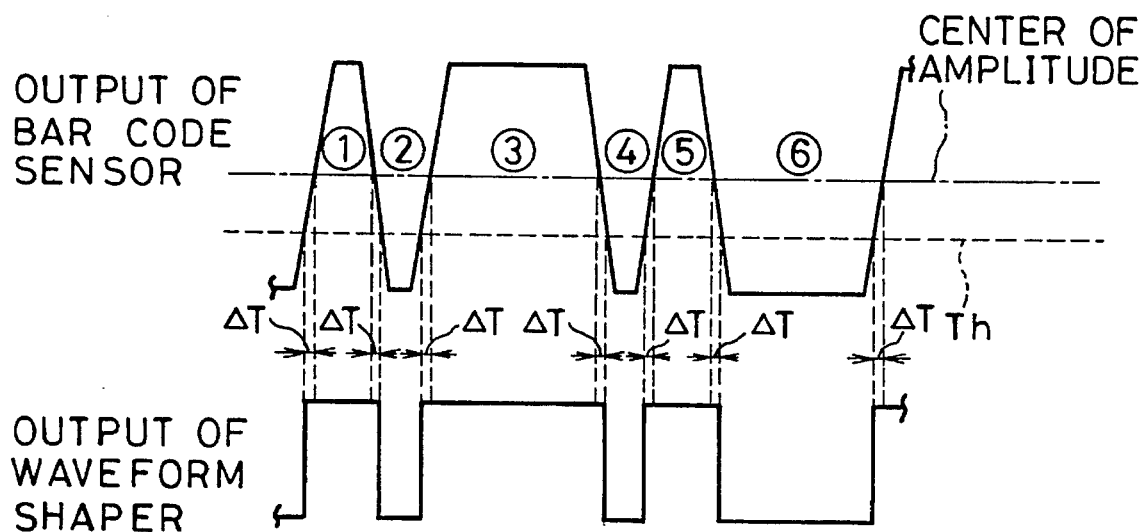
FIGS. 10A and 10B show an example of a bar code and the waveforms of outputs of the photosensor and the waveform shaper of the embodiment explained with FIGS. 9A to 9D.
Figure 10B:
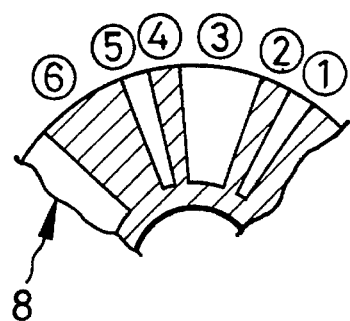

With reference to FIGS. 9 and 10, another embodiment will be described in which a bar width can be correctly judged even if the amplitude center of a photoelectrical signal of the bar code sensor 30 is not coincident with the threshold value Th. If the threshold value Th is lower than the amplitude center of the photoelectrical signal, at the fall edge changing from the white bar to the black bar an output of the waveform shaper 33 changes to the L level at a timing delayed by $\Delta T$ from the correct timing when the photoelectrical signal becomes lower than the threshold level Th. At the rise edge changing from the black bar to the white bar an output of the waveform shaper 33 changes to the H level at a timing earlier by $\Delta T$ because of the same rise time as the fall time.

The width of a signal outputted from the waveform shaper 33 becomes wide by an amount corresponding to a time $2\times\Delta T$ for the L level signal, and becomes narrow by an amount corresponding to the time $2\times\Delta T$. It is understood that an increase/decrease of the widths of a pair of consecutive L and H level signals or consecutive H and L level signals is cancelled out. By using this phenomenon, the bar width can be correctly judged by the following procedure.

First, a timer count $T_{ST}$ obtained by measuring the reference section 21b is stored in RAM. This timer count $T_{ST}$ is used as a preceding timer count Tpre, and the reference timer count Tref ($=T_{ST}/A$) is calculated and stored in RAM.

Next, the first black bar in the data area is measured to obtain the timer count T of the L level signal width. This timer count T is added to the timer count Tpre stored in RAM to obtain a present modified timer count Tj of the present bar. Since the reference section 21b has the unit width multiplied by A, the modified timer count Tj is about $(A+3)\times$Tref if the detected black bar is the wide bar, and is about $(A+1)\times$Tref if the detected black bar is the narrow bar.

The value $(A+2)\times$Tref is used as the reference value. If the modified timer count Tj is larger than the reference value $(A+2)\times$Tref, the logical value of the read black bar is judged to be "1" and the reference timer count Tref is set to Tj/(A+3). If the modified timer count Tj is smaller than the reference value $(A+2)\times$Tref, the logical value of the read black bar is judged to be "0" and the reference timer count Tref is set to Tj/(A+1). As will be later described, similar to the second bar, the signal width may be judged from 3×Tref and 5×Tref, by determining that the reference section 21b has the wide range (logical value "1").

The timer count Tpre of the previous bar is replaced by the timer count T of the black bar, and the timer is reset and restarted. The white bar is then detected, and the timer count T of the white bar is obtained from the H level signal width. This timer value T is added to the previous timer count Tpre to obtain the modified timer count Tj.

Figures 11, 18:
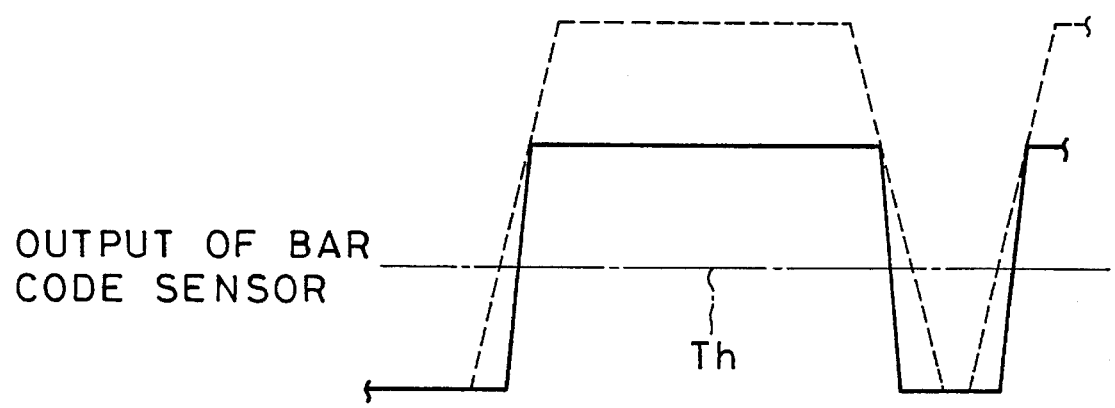
FIG. 11 is a table showing combinations of bar code logical values and added signal width values.
FIG. 18 illustrates a change in the output of the photosensor with or without the slit.

As shown in FIG. 11, the modified timer count Tj can take three values in accordance with combinations of the timer count (signal width) Tpre of the previous bar and the timer count (signal width) T of the present bar. If the logical value for the previous black bar is "0", the value of the modified timer count is about 2×Tref for the present narrow white bar (logical value "0") 26, and about 4×Tref for the present wide white bar (logical value "1") 25. If the logical value for the previous black bar is "1", the value of the modified timer count is about 4×Tref for the present narrow white bar (logical value "0") 26, and about 6×Tref for the present wide white bar (logical value "1") 25.

Some margin of logical decision is provided. Namely, if the modified timer count Tj is smaller than a reference value 3×Tref (Tj<3×Tref), the white bar is judged as the narrow white bar (logical value "0") 26 and the value Tref is set to Tj/2. If the modified timer count Tj is larger than the reference value 3×Tref and smaller than a reference value 5×Tref, the white bar is judged to be the narrow white bar (logical value "0") 26 if the logical value of the previous bar is "1", and judged to be the narrow white bar (logical value "0") 26 if the logical value of the previous bar is "0". The value Tref is set to Tj/4. If the modified timer count Tj is larger than the reference value 5×Tref (Tj>5×Tref), the white bar is judged to be the wide white bar (logical value "1"), and the value Tref is set to Tj/6.

After the width of the white bar is judged, the timer count Tpre of the previous bar is replaced by the timer count T of the present bar. The black bar is then detected. The timer count T of the L level signal width outputted from the waveform shaper 33 is added to the timer count Tpre of the previous bar to obtain the modified timer count Tjj. Similar to the previous white bar, this modified timer count Tj takes one of the three values shown in FIG. 11. The black bar is judged in the similar manner described above, and the reference timer count Tref and the timer count Tpre of the previous bar are updated.

Figure 12A:
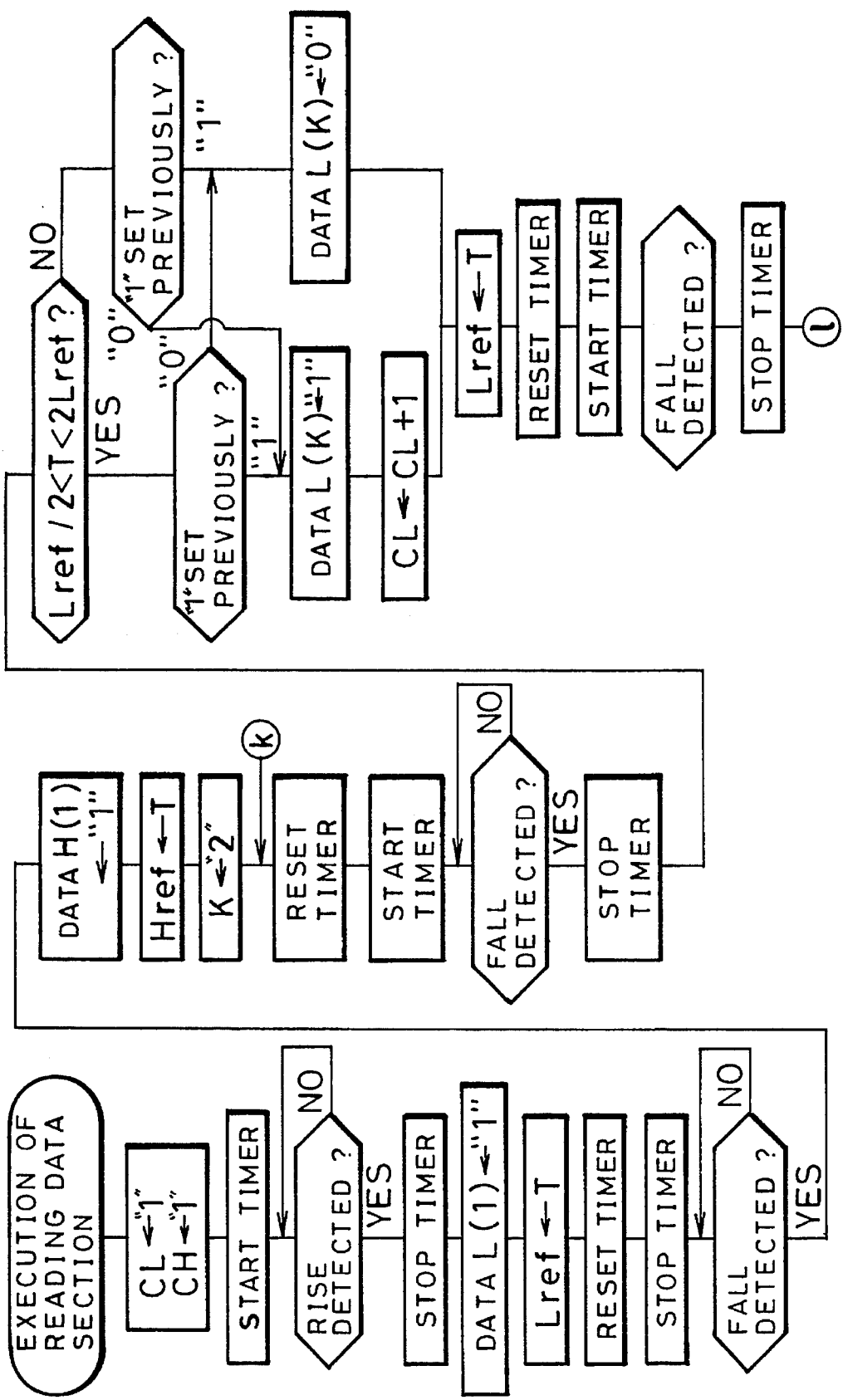
FIGS. 12A nd 12B are flow charts explaining the operation of another embodiment in which a parity function is added to a bar code.
Figure 12B:
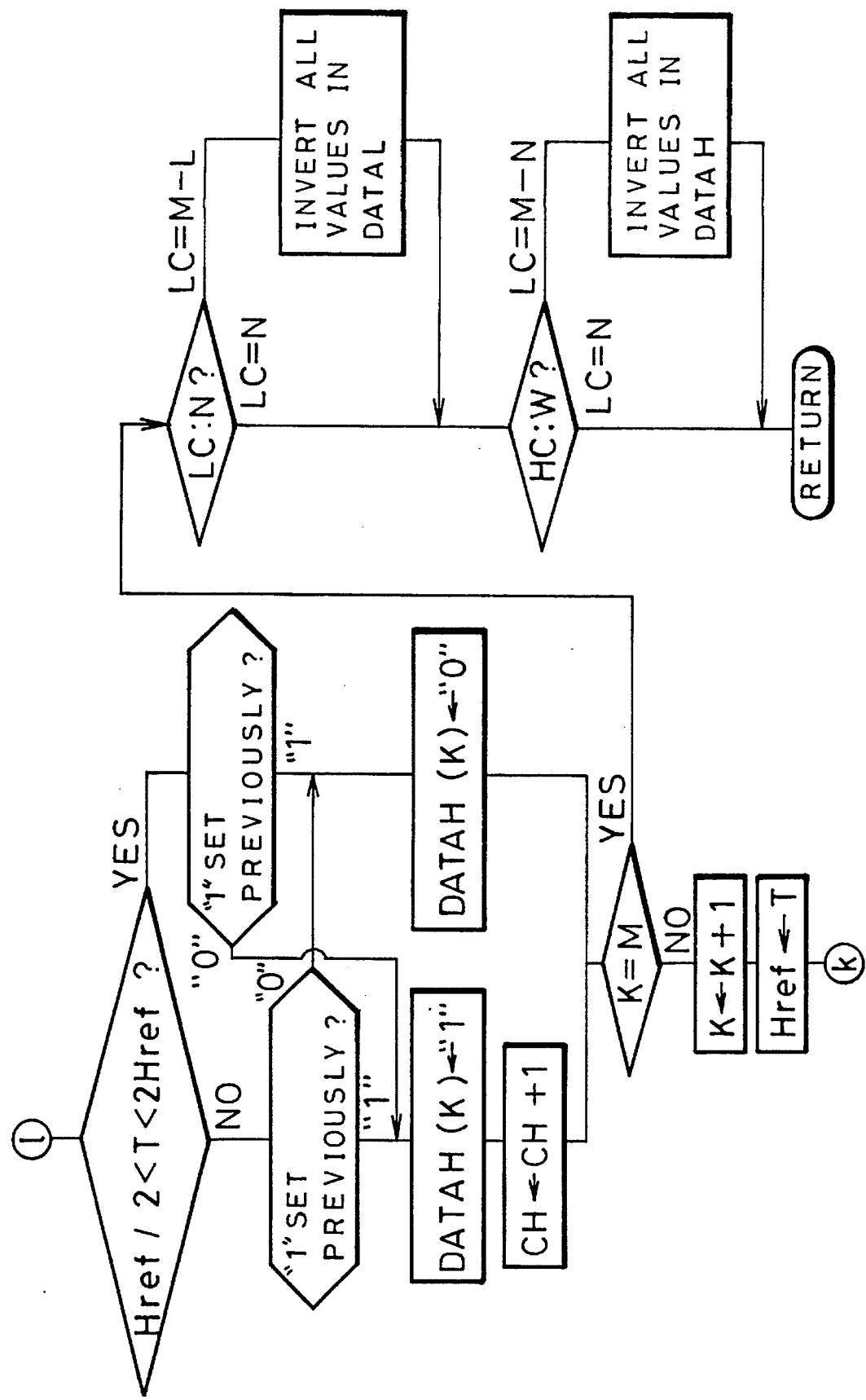

In order to decode bar codes correctly, it is effective to add a parity function to the bar codes. An example of a bar code having a parity function will be described with reference to the flow charts shown in FIGS. 12A and 12B. The data area of a bar code having a parity function is constructed of M black bars and M white bars. Of the M logical values of the black bars, N logical values are "1", and of the M logical values of the white bars, W logical values are "1" [M>N, M−N≠N, M−W≠W]. For example, the bar code shown in FIG. 3 is generated in accordance with the rule of M=7, N=2, and W=4.

First, $T_{ST}$ of the reference section 21b is counted by the counter to judge the bar width by the procedure described above. The values of counters for counting the logical value "1" are set to "1". The signal width of the first black bar in the data area is counted by the timer to set this timer count T as the reference timer count Lref. Assuming that the logical value of this black bar is "1", DATAL (1)="1" is stored in RAM. Next, the signal width of the white bar is counted by the timer to set this timer count as the reference timer count Href. Assuming that the logical value of this white bar is "1", DATAH (1)="1" is stored in RAM.

Thereafter, the timer count T of the signal width of the K-th bar is checked whether it satisfies the judgement condition of Lref/2<T<2×Lref. In the case where the logical value of the (K−1)-th black bar has been judged as "1", the logical value "1" is stored in DATAL (K) if the timer count T satisfies the judgement condition, and the counter value CL is incremented by "1". If the condition is not satisfied, the logical value "0" is stored in DATAL (K), and the timer count T is set as the reference timer count Lref. In the case where the logical value of the (K–1)-th black bar has been judged as "0", the logical value "0" is stored in DATAL (K) if the timer count T satisfies the judgement condition. If the condition is not satisfied, the logical value "1" is stored in DATAL (K), and the counter value CL is incremented by "1". Lref is replaced by the present timer count T.

The K-th white bar is also judged by using a judgement condition of Href/2<T<2×Href, and the result is stored as DATAH (K). The reference timer count Href is updated by using the present timer count T.

After the widths of M black bars are judged, the number CL of logical values "1" is compared with N. If they coincide, the data is effective because the assumption of the first logical value is correct. If N=M–N, the assumption of the first logical value is incorrect. In this case, the logical values of stored data (DATAL) of the black bars are all inverted. Similarly, if the number CH of white bar logical values "1" coincides with W, the data is effective because the assumption of the first logical value is correct. If W=M–W, the assumption of the first logical value is incorrect. In this case, the logical values of stored data (DATAH) of the white bars are all inverted.

In this manner, all logical values having parameters of M, N, and W determined by a rule can be correctly judged. A different parity function may also be added to bar codes. In this embodiment, the judgement criterion uses the reference timer counts Lref divided by 2 and multiplied by 2. However, other values may also be used.

Next, another embodiment will be described with reference to FIG. 13, wherein an optimum photoelectrical signal is provided so as to correctly read a bar code. The collector of a transistor 40 is connected to a cathode of a light emitting diode 31, the base thereof being connected to a D/A port 42a of a microcomputer 42, and the emitter thereof is grounded via a resistor 40a. The drain of an FET 41 is connected to the emitter of a phototransistor 32, to an A/D port 42b of the microcomputer 42, and to a waveform shaper 33. The source of FET 41 is grounded and the gate thereof is connected to another D/A port 42c of the microcomputer 42. Like elements to those shown in FIG. 4 are represented by using identical reference numerals.

The microcomputer 42 detects an output voltage V0 of the transistor 32 and controls the output voltages at the D/A ports 42b and 42c. The transistor 40 connected to the D/A port 41b changes its drive current entering the base produced by a base-emitter voltage so that a current flowing through the light emitting diode 31 is increased or decreased to adjust the emission intensity thereof. As well known, in accordance with a drive voltage applied from the D/A port 42c to the gate of FET 41, the output voltage V0 of the phototransistor 32 is raised or lowered. An output of the waveform shaper 33 is inputted to a timer port 42d of the microcomputer 42. By using one of the judgement methods of the above-described embodiments, a bar width is judged from an output signal of the waveform shaper 33. This and other embodiments may be applied to a conventional method and apparatus, such as a method and apparatus using a predetermined reference value.

Figure 13:
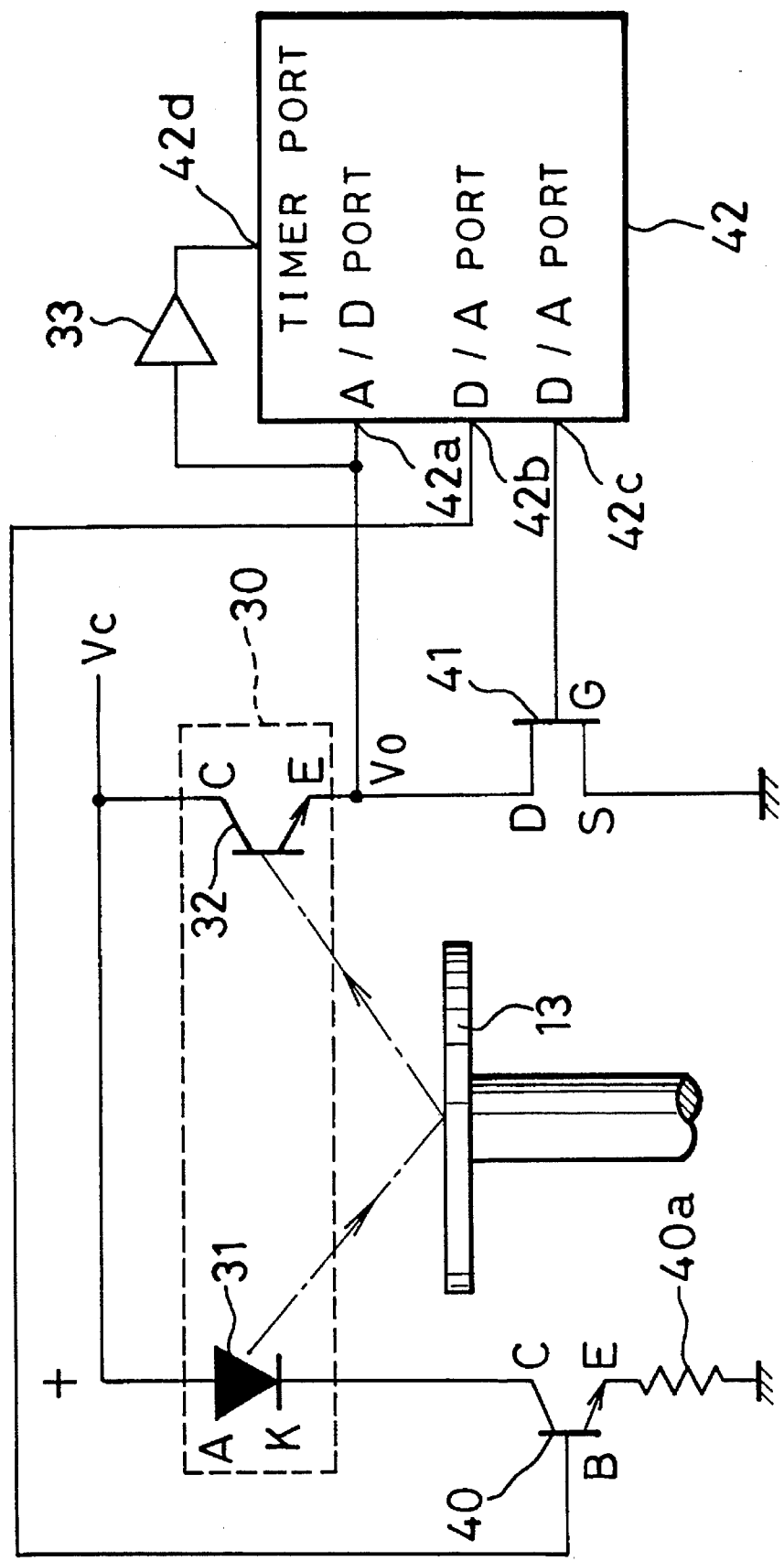
FIG. 13 is a circuit diagram of a bar code reader in which the drive current and output voltage of the photosensor are controlled.

The operation of the apparatus shown in FIG. 13 will be briefly described. At the same time when the bar code disc 8 starts rotating, the microcomputer 42 detects an amplitude of an output voltage of the bar code sensor 30. If the amplitude center is higher than the threshold value, a voltage at the D/A port 42b is lowered to reduce a drive current of the transistor 40. With a reduced drive current, a current flowing through the photodiode 31 reduces so that the amount of light projected to the bar code 7 reduces and the output voltage V0 lowers while the phototransistor 32 detects a white bar.

Conversely, if the amplitude center is lower than the threshold value, a voltage at the D/A port 42b is raised to increase a drive current of the transistor 40. Since the amount of light projected to the bar code 7 increases, the output voltage V0 of the phototransistor 32 rises.

If the output voltage V0 is higher than a predetermined optimum voltage of the waveform shaper 33 while a white bar is read, or if the amplitude center is higher than the threshold value, a gate drive voltage of FET 41 is raised (in the case of p-channel FET) to increase the resistance value of FET 41. Even if the resistance value is increased, the phototransistor 32 operates in a linear range and the collector current (output current of the phototransistor 32) hardly changes even if the collector-emitter voltage thereof lowers. As a result, the output voltage V0 rises which is a product of the resistance value of FET 41 and the collector current. If the output voltage V0 is lower than the optimum voltage or if the amplitude center is lower than the threshold value, the gate drive voltage is raised to lower the resistance value of FET 41 and lower the output voltage V0.

The data area is read and decoded after the amplitude of an output signal of the bar code sensor 30 in the above manner. It is therefore possible to set the amplitude center of an output signal of the bar code sensor 30 to the threshold value and obtain an optimum waveform to be read and analyzed, resulting in correct data reading.

Figure 14:
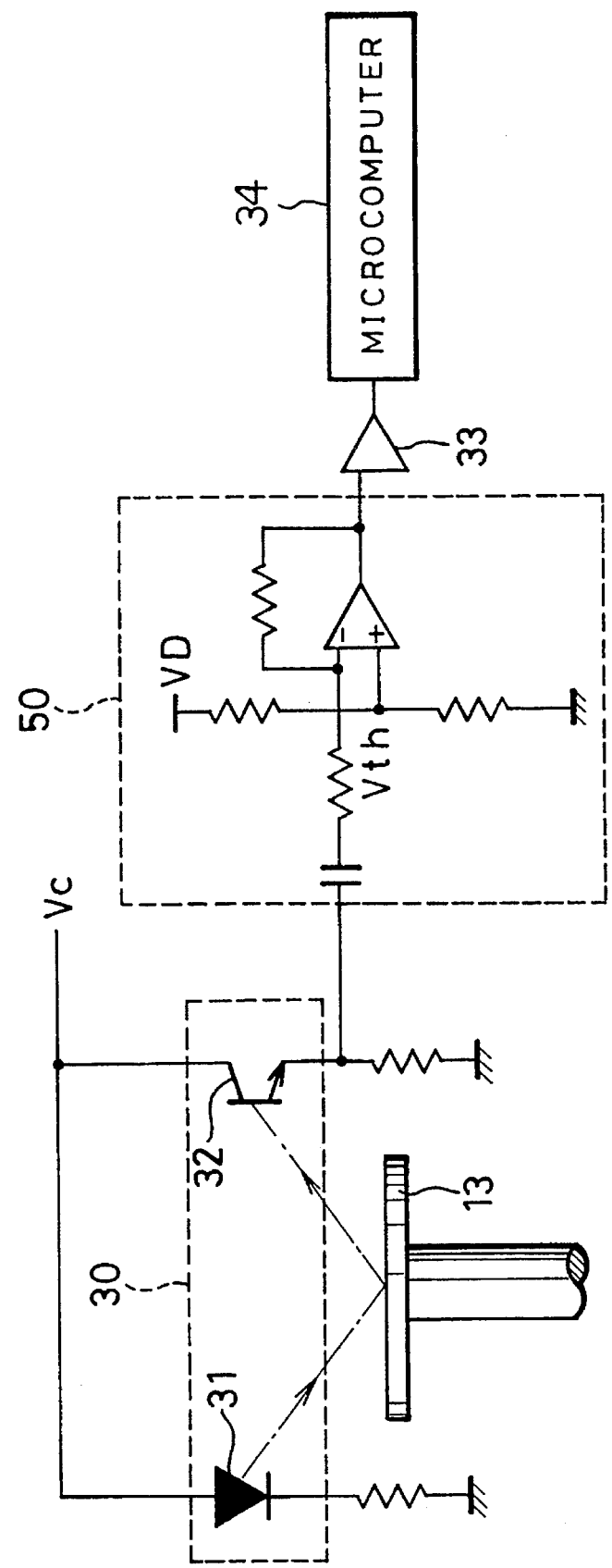
FIG. 14 is a circuit diagram of another embodiment in which an output of the photosensor is applied to an AC amplifier.
Figure 15:
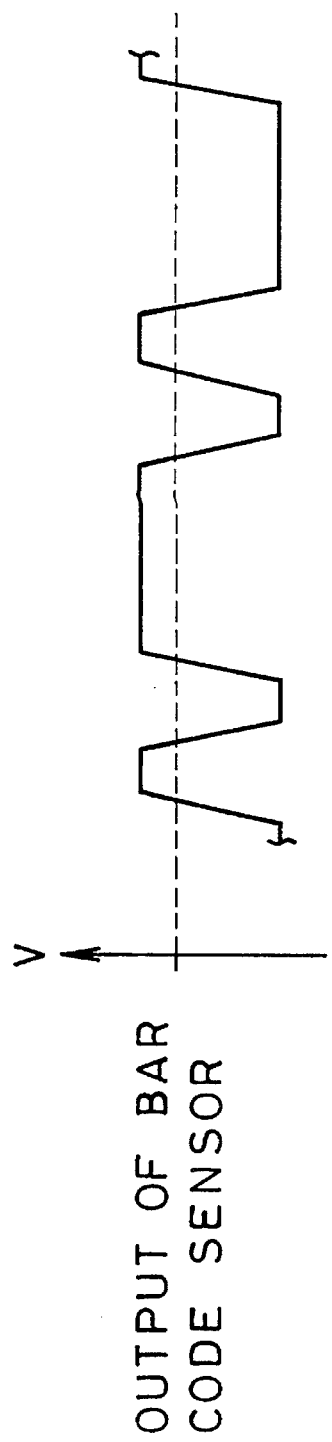
FIGS. 15A and 15B show the waveform of an output signal of the photosensor and the waveform of an AC amplified signal.
Figure 15:
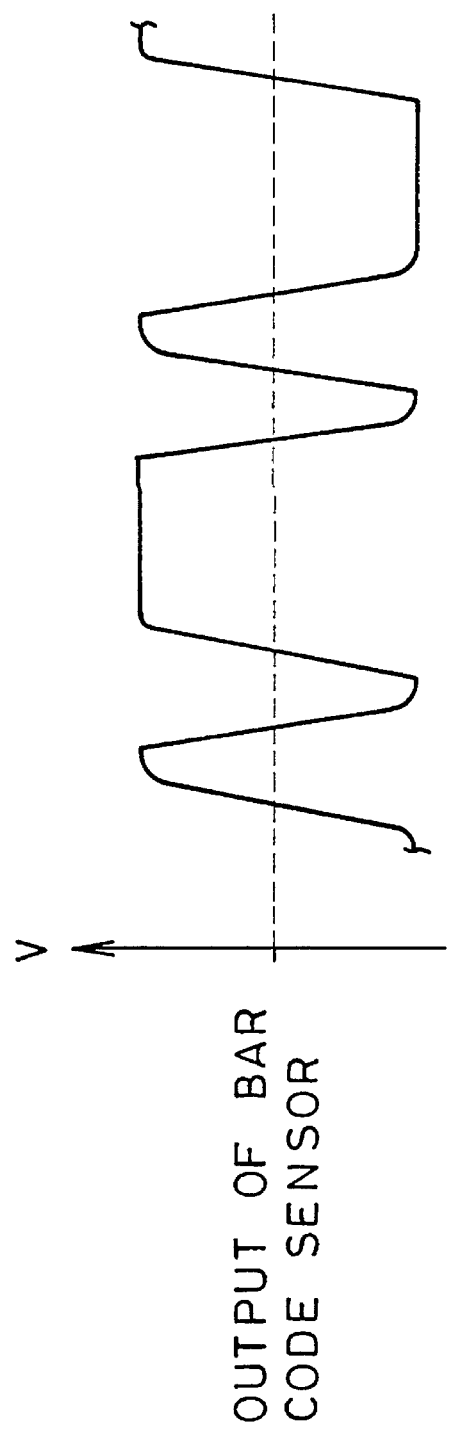

In order to obtain an optimum waveform to be read and analyzed, an alternative method may be used as in the following. As shown in FIG. 14, an output of the bar code sensor 30 is inputted to an AC amplifier 50. The non-inverting input terminal of the AC amplifier 50 is applied with the threshold voltage Vth so that the output thereof is set to the same level as the threshold value Vth. Even if the amplitude center of a signal outputted from the bar code sensor 30 is different from the threshold value Vth as shown in FIG. 15A, the AC amplifier 50 outputs a signal oscillating with its center being fixed to the threshold voltage Vth as shown in FIG. 15B.

Since the signal oscillates with the amplitude center of an output of the bar code sensor 30 being set to the same level as the threshold value Vth, the width of a signal outputted from the waveform shaper will not be affected by the amplitude center of an output signal of the bar code sensor 30.

Figure 16:
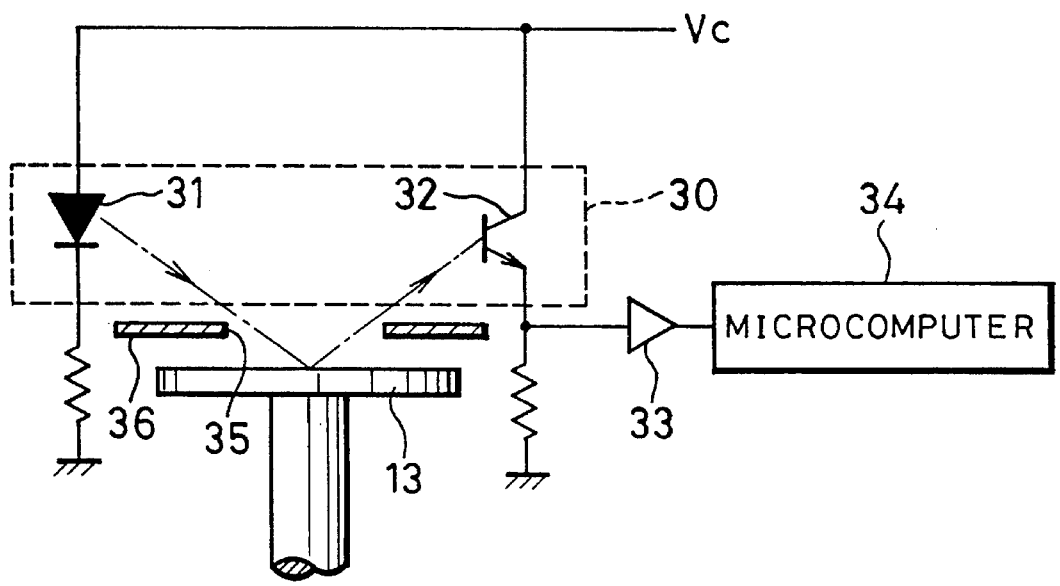
FIG. 16 is a circuit diagram of another embodiment in which a slit is provided in front of the photosensor.
Figure 17:
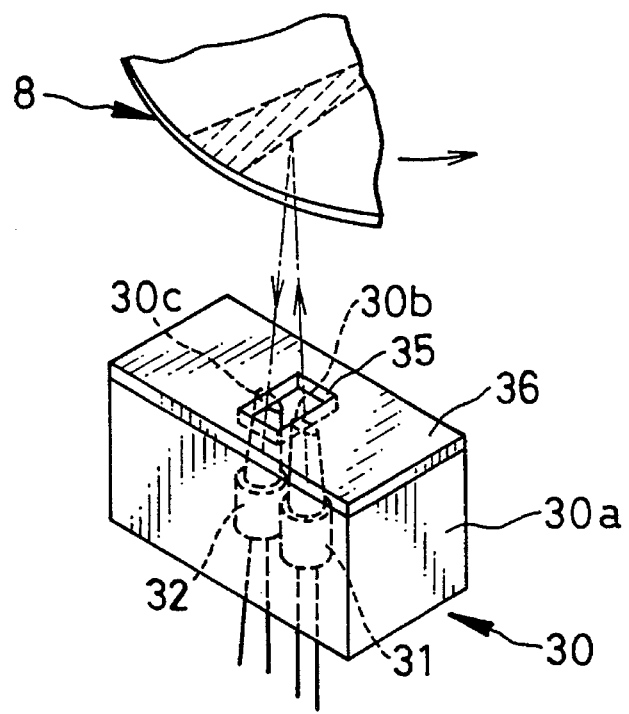
FIG. 17 is a perspective view showing the structures of the photosensor and slit.

FIG. 16 shows an embodiment wherein the intensity of light incident upon the bar code sensor is adjusted. A mask 35 with a narrow slit 36 is provided in front of the bar code sensor 30. As shown in FIG. 17, a light emitting diode 31 and a phototransistor 32 are accommodated within a sensor housing 30a. The sensor housing 30a is formed with openings 30b and 30c. Light from the light emitting diode 31 is projected to the bar code disc 8 via the opening 30b, and light reflected from the bar code disc 8 is incident upon the phototransistor 32 via the opening 30c. The mask 36 is mounted on the sensor housing 30a so that the slit 35 is superposed partially on the openings 30b and 30c.

As indicated by a broken line in FIG. 18, an output signal of the bar code sensor 30 without the slit has a high signal level, and if the signal does not oscillate with its center being fixed to the threshold value, the signal width changes as described previously. If the slit 36 is provided in front of the bar code sensor 30, the radiated light amount of the light emitting diode 31 and the incident light amount of the phototransistor 32 are limited. Therefore, as indicated by a solid line in FIG. 18, an output signal of the phototransistor 32 oscillates with its center being fixed to the threshold value. Furthermore, the rise and fall edges of an output signal become sharp because the area of the light receiving surface of the bar code sensor 30 becomes small. With the sharp rise and fall edges, a change in the width of a signal outputted from the waveform shaper 33 becomes small even if the amplitude center shifts more or less from the threshold value. One of the light emitting diode and phototransistor 32 may be masked.

In the above embodiments, a bar width (logical value) is judged while the bar is read. Timer counts of all bars may be written once in a memory to judge thereafter the bar widths. The reference timer count Tref may be set to any other value instead of the timer count of the reference section 21b divided by A. For example, if the black quiet zone 20 has the unit width multiplied by B, the reference timer count Tref may be set to a definite width of the black quiet zone 20 divided by B.

Reading a bar code may be performed when each frame is wound as well as when the film leader is transported at the initial feed. It is known that in pulling the film leader out of the cassette, the cassette spool is first rotated a little in the film winding direction to wind the film roll firmly and then it is rotated in the film unwinding direction to pick up the leader out of the cassette. In this case, reading a bar code may be performed while the cassette spool is rotated in the film winding direction. The present invention may be applied to a 135 type photographic film cassette now commercially available.

Although the present invention has been described with reference to the preferred embodiments shown in the drawings, the invention should not be limited by the embodiments but, on the contrary, various modifications, changes, combinations and the like of the present invention can be effected without departing from the spirit and scope of the appended claims.

We claim:

1. A method of reading a bar code from a photographic film cassette, the cassette having a cassette shell, a spool rotatably mounted within the cassette shell and wound with a photographic film, a bar code disc rotating with the spool, and a bar code disposed on the bar code disc in the rotation direction, said bar code being constituted by plural bars of a black type and of a white type, each of the black and white bars comprising a wide bar and a narrow bar in the rotation direction to represent binary information, said method comprising the steps of:

measuring a pass time required for each said bar passing a measuring point during the rotation of said bar code disc;

determining a reference value in accordance with said pass time of a last read old bar which is the same type as or a different type from a presently read new bar; and comparing said pass time of said new bar presently read with said reference value, in order to determine whether said new bar is said wide bar or said narrow bar.

2. A bar code reading method according to claim 1, wherein said wide bar is N times as wide as said narrow bar.

3. A bar code reading method according to claim 2, wherein said M is 3 and said N is 3.

4. A bar code reading method according to claim 1, further comprising steps of:

forming N wide bars or N narrow bars among M bars of a first type in said bar code, said first type being said black type or said white type;

measuring a first pass time required for a Kth one of said M bars of said first type passing said measuring point;

measuring a second pass time required for a (K+1)th one of said M bars of said first type passing said measuring point;

determining a first greater reference value and a second smaller reference value in accordance with said first pass time;

comparing said second pass time with said first and second reference values, respectively, to detect whether said second pass time is between said first and second reference values; and detecting the number of occurrences where said second pass from said M bars of said first type is between said first and second reference values, and when said second pass time is between said first and second reference values for N times, then said bar code is judged to have been correctly read, and when said second pass time is between said first and second reference values for (M−N) times, then said bar code is judged to have been detected with said binary information inverted.

5. A bar code reading method according to claim 1, wherein said last old bar code is a different type than said presently read new bar code.

6. A method for reading a bar code from a photographic film cassette, the cassette having a cassette shell, a spool rotatably mounted within the cassette shell and wound with a photographic film, a bar code disc rotating with the spool, and a bar code disposed on the bar code disc, said bar code being constituted by plural bars of a black type and of a white type, each of the black and white bars comprising a wide bar and a narrow bar in the rotation direction to represent binary information, said method comprising the steps of:

measuring a pass time required for each said bar passing a measuring point during the rotation of said bar code disc;

determining a reference value in accordance with said pass time of a last read old bar which is the same type as or a different type from a presently read new bar, wherein said reference value determining step comprises the steps of:

storing a reference pass time in a memory, said reference pass time being 1/N as long as said pass time of said old bar if said old bar is said wide bar, and being said pass time of said old bar if said old bar is said narrow bar; and multiplying M by said reference pass time read from said memory, to obtain said reference value, to be set to a value between said pass time of said wide bar and said pass time of said narrow bar; and comparing said pass time of said new bar presently read with said reference value, in order to determine whether said new bar is said wide bar or said narrow bar, wherein said wide bar is N times as wide as said narrow bar.

7. A bar code reading method from a photographic film cassette, the cassette having a cassette shell, a spool rotatably mounted within the cassette shell and wound with a photographic film, a bar code disc rotating with the spool, and a bar code disposed on the bar code disc in the rotation direction, said bar code being constituted by plural bars of a black type and of a white type, each of the black and white bars comprising a wide bar and a narrow bar in the rotation direction to represent binary information, said method comprising the steps of:

measuring a pass time required for each said bar passing a measuring point during the rotation of said bar code disc;

determining a reference value in accordance with said pass time of a last read old bar which is the same type as or a different type from a presently read new bar, wherein said reference value determining step comprises the steps of:

storing a reference pass time in a memory, said reference pass time being 1/N as long as said pass time of said old bar if said old bar is said wide bar, and being said pass time of said old bar if said old bar is said narrow bar; and multiplying M by said reference pass time read from said memory, to obtain said reference value, to be set to a value between said pass time of said wide bar and said pass time of said narrow bar; and comparing said pass time of said new bar presently read with said reference value, in order to determine whether said new bar is said wide bar or said narrow bar, wherein said wide bar is N times as wide as said narrow bar, wherein M=(N+1)/2 when N is an odd number, and M=N/2 or (N+2)/2 when N is an even number.

8. A method of reading a bar code from a photographic film cassette, the cassette having a cassette shell, a spool rotatably mounted within the cassette shell and wound with a photographic film, a bar code disc rotating with the spool, and a bar code disposed on the bar code disc in the rotation direction, said bar code being constituted by plural bars of a black type and of a white type, each of the black and white bars comprising a wide bar and a narrow bar in the rotation direction to represent binary information, said method comprising the steps of:

measuring a pass time required for each said bar passing a measuring point during the rotation of said bar code disc;

storing said pass time of a last read old bar;

adding a pass time of a new bar presently read to said pass time of said old bar, to obtain a modified pass time of said new bar; and determining the width of said new bar in accordance with said modified pass time.

9. A bar code reading method according to claim 8, wherein said width determining step comprises the steps of:

obtaining a reference pass time Tref in accordance with said pass time and said width of said old bar, said reference pass time corresponding to said pass time of said narrow bar;

obtaining a first reference value (3×Tref) and a second reference value (5×Tref) from said reference pass time; and judging that said new bar is said narrow bar if said modified pass time is shorter than said first reference value, that said new bar is said wide bar if said modified pass time is longer than said second reference value, and that said new bar has said width different from said width of said old bar.

10. An apparatus for reading a bar code from a photographic film cassette, the cassette having a cassette shell, a spool rotatably mounted within the cassette shell and wound with a photographic film, a bar code disc rotating with the spool, and a bar code disposed on the bar code disc in the rotation direction, said bar code being constituted by plural bars of a black type and of a white type, each of the black and white bars comprising a wide bar and a narrow bar in the rotation direction to represent binary information, said apparatus comprising:

a bar code sensor for photoelectrically detecting said bar during the rotation of said bar code disc and for generating a photoelectrical signal having a signal level corresponding to the type of said bar and having a signal width corresponding to the width of said bar, said bar code sensor including a light projector for projecting light toward said bar code and a photosensor for receiving light reflected from said bar code;

a timer for measuring said signal width and converting said signal width into a pass time of said bar;

a first operational unit for obtaining a reference pass time in accordance with said pass time and said width of an old bar last read which is the same a different type from the type of a new bar presently read, said reference pass time corresponding to pass time of said narrow bar;

a second operational unit for obtaining a reference value from said reference pass time, said reference value being set to a value between pass time of said wide bar and said pass time of said narrow bar; and means for determining said width of said new bar by comparing pass time of said new bar with said reference value.

11. An apparatus for reading a bar code from a photographic film cassette, the cassette having a cassette shell, a spool rotatably mounted within the cassette shell and wound with a photographic film, a bar code disc rotating with the spool, and a bar code disposed on the bar code disc in the rotation direction, said bar code being constituted by plural bars of a black type and of a white type, each of the black and white bars comprising a wide bar and a narrow bar in the rotation direction to represent binary information, said apparatus comprising:

a bar code sensor for photoelectrically detecting said bar during the rotation of said bar code disc and for generating a photoelectrical signal having a signal level corresponding to the type of said bar and having a signal width corresponding to the width of said bar, said bar code sensor including a light projector for projecting light toward said bar code and a photosensor for receiving light reflected from said bar code;

a timer for measuring said signal width and converting said signal width into a pass time of said bar;

a memory for storing said pass time of a last read old bar;

a first operational unit for adding pass time of a new bar presently read to said pass time of said old bar, to obtain a modified pass time of said new bar;

a second operational unit for obtaining a reference pass time in accordance with said pass time and said width of said old bar, said reference pass time corresponding to said pass time of said narrow bar;

a third operational unit for obtaining a first reference value and a second reference value from said reference pass time; and means for judging that said new bar is said narrow bar if said modified pass time is shorter than said first reference value, that said new bar is said wide bar if said modified pass time is longer than said second reference value, and that said new bar has said width different from said width of said old bar.

12. An apparatus according to claim 11, wherein said first reference value is three times as great as said reference pass time, and said second reference value is five times as great as said reference pass time.

13. An apparatus according to claim 10 or 11 further comprising means for binarizing said photoelectrical signal by a predetermined threshold value.

14. An apparatus according to claim 13, further comprising control means for adjusting the intensity of said light of said light projector or said reflected light incident upon said photosensor, so as to make an amplitude center of said photoelectrical signal coincide with said threshold value.

15. An apparatus according to claim 13, further comprising means for adjusting the amplitude of said photoelectrical signal from said bar code sensor so as to make an amplitude center of said photoelectrical signal coincide with said threshold value.

16. An apparatus according to claim 13, further comprising a.c. amplifying means for amplifying said photoelectrical signal so as to make an amplitude center of said photoelectrical signal coincide with said threshold value, and for supplying said amplified photoelectrical signal to said binarizing means.

17. An apparatus according to claim 11, further comprising control means for adjusting the intensity of said light of said light projector or said reflected light incident upon said photosensor so as to make an amplitude center of said photoelectrical signal coincide with said threshold value.

18. An apparatus according to claim 11, further comprising means for adjusting the amplitude of said photoelectrical signal from said bar code sensor so as to make an amplitude center of said photoelectrical signal coincide with said threshold value.

19. An apparatus according to claim 11, further comprising a.c. amplifying means for amplifying said photoelectrical signal so as to make an amplitude center of said photoelectrical signal coincide with said threshold value, and for supplying said amplified photoelectrical signal to said binarizing means.

* * * * *